(12) United States Patent
Sasai et al.

(10) Patent No.: US 8,304,133 B2
(45) Date of Patent: Nov. 6, 2012

(54) METHOD FOR PRODUCING A POLYMER ELECTROLYTE MEMBRANE

(75) Inventors: Kousuke Sasai, Ohtsu (JP); Hiroki Yamaguchi, Ohtsu (JP); Yoshimitsu Sakaguchi, Ohtsu (JP); Kouta Kitamura, Ohtsu (JP); Masahiro Yamashita, Ohtsu (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 650 days.

(21) Appl. No.: 12/520,767

(22) PCT Filed: Dec. 26, 2007

(86) PCT No.: PCT/JP2007/074915
§ 371 (c)(1),
(2), (4) Date: Jun. 22, 2009

(87) PCT Pub. No.: WO2008/081802
PCT Pub. Date: Jul. 10, 2008

(65) Prior Publication Data
US 2010/0055536 A1    Mar. 4, 2010

(30) Foreign Application Priority Data

Dec. 26, 2006  (JP) ................. 2006-349111
Apr. 6, 2007   (JP) ................. 2007-100150
Sep. 21, 2007  (JP) ................. 2007-245049
Sep. 21, 2007  (JP) ................. 2007-245050

(51) Int. Cl.
*H01M 8/10* (2006.01)

(52) U.S. Cl. ........ 429/492; 429/400; 429/479; 429/491; 429/493; 264/650; 521/27; 521/30

(58) Field of Classification Search ............... 429/492, 429/400, 479, 491, 493; 264/650; 521/27, 521/30
See application file for complete search history.

(56) References Cited

U.S. PATENT DOCUMENTS

| | | | |
|---|---|---|---|
| 7,537,852 B2 * | 5/2009 | Hamamoto et al. | 429/535 |
| 2006/0216566 A1 | 9/2006 | Yamakawa et al. | |
| 2009/0075147 A1 * | 3/2009 | Kitamura et al. | 429/33 |
| 2011/0065021 A1 * | 3/2011 | Kitamura et al. | 429/494 |
| 2012/0129076 A1 * | 5/2012 | Ichimura et al. | 429/493 |

FOREIGN PATENT DOCUMENTS

| | | |
|---|---|---|
| CA | 2537795 A1 | 3/2005 |
| JP | 2003-192805 A | 7/2003 |
| JP | 2005-232240 A | 9/2005 |
| JP | 2005-235466 A | 9/2005 |
| JP | 2006-253003 A | 9/2006 |
| JP | 2006-299245 A | 11/2006 |
| WO | WO 2005/023921 A1 | 3/2005 |

* cited by examiner

*Primary Examiner* — Douglas McGinty
(74) *Attorney, Agent, or Firm* — Leydig, Voit & Mayer, Ltd.

(57) ABSTRACT

The invention provides a method for producing a polymer electrolyte membrane including (A) a membrane formation step of forming a membrane-form product of an ionic group-containing polymer electrolyte on a support, (B) an acid treatment step of exchanging the ionic group into an acid type by bringing the membrane into contact with an inorganic acid-containing acidic liquid, (C) an acid removal step of removing a free acid in the acid-treated membrane, and (D) a drying step of drying the acid-removed membrane, wherein the steps (B) to (D) are carried out without separating the membrane from the support.

13 Claims, No Drawings

METHOD FOR PRODUCING A POLYMER ELECTROLYTE MEMBRANE

CROSS-REFERENCE TO RELATED APPLICATION(S)

This application is the U.S. national stage of International Patent Application No. PCT/JP2007/074915, filed on Dec. 26, 2007, which claims priority to Japan Patent Application No. 2007-245050 filed on Sep. 21, 2007, Japan Patent Application No. 2007-245049 filed on Sep. 21, 2007, Japan Patent Application No. 2007-100150 filed on Apr. 6, 2007, and Japan Patent Application No. 2006-349111 filed on Dec. 26, 2006.

TECHNICAL FIELD OF THE INVENTION

The present invention relates to a method for producing a polymer electrolyte membrane.

BACKGROUND ART

In recent years, new technologies for electrical power generation excellent in energy efficiency and environmental properties have drawn attention. Among these technologies, a solid polymer fuel cell having a polymer solid electrolyte membrane has characteristics such that energy density is large, and start and stop are easy since a driving temperature is low as compared with fuel cells in other modes, and thus, development of the solid polymer fuel cell has been progressed as a power supply for an electrical automobile and dispersed power generation.

A proton conductive ion exchange membrane is generally used for a polymer solid electrolyte membrane. It is required that the polymer solid electrolyte membrane has characteristics such as mechanical strength and fuel permeation suppressing property for preventing permeation of hydrogen, etc that is a fuel in addition to proton conductivity. It has been found that irregularity in thickness, wrinkles and unevenness of an electrolyte membrane have an influence on these characteristics.

Conventionally, a method of drying by applying tension to a membrane has been reported as a means for overcoming wrinkles and unevenness (for example, please see Japanese Patent Application Laid-Open (JP-A) No. 2003-192805). However, there was a problem such that a thickness becomes nonuniform between a fixed part periphery and a part separated furthest from the fixed part. Further, there was also a problem such that fixing only during drying cannot sufficiently overcome wrinkles and unevenness generated in steps before drying. In particular, as to a polymer solid electrolyte membrane produced by, what is called, solution membrane formation (i.e. forming a membrane by casting a solvent solution of a polymer electrolyte on a support and then removing the solvent to form a membrane), not only improvement in stability of a membrane shape, but also improvement in stability of a membrane form, stability of membrane characteristics, and the like have been required.

DISCLOSURE OF THE INVENTION

Problem that the Invention is to Solve

The present invention was made with problems of such conventional arts as the background, and an object thereof is to provide a method for producing a polymer electrolyte membrane in which irregularity in thickness, wrinkles and unevenness hardly occur and stability of membrane form, stability of membrane characteristics, and the like are improved by a stable membrane formation method.

Means for Solving the Problem

The inventors of the present invention have made intensive studies, and as a result, they have found that the above described problems can be resolved by means shown below and have achieved a first invention.

That is, the first invention has the following constitutions.

[1] A method for producing a polymer electrolyte membrane including (A) a membrane formation step of forming a membrane-form product of an ionic group-containing polymer electrolyte on a support, (B) an acid treatment step of exchanging the ionic group into an acid type by bringing the membrane into contact with an inorganic acid-containing acidic liquid, (C) an acid removal step of removing a free acid in the acid-treated membrane, and (D) a drying step of drying the acid-removed membrane, wherein the steps (B) to (D) are carried out without separating the membrane from the support.

[2] The method for producing a polymer electrolyte membrane according to [1], wherein the membrane formation step (A) includes ($A_1$) a casting step of casting a solvent solution of an ionic group-containing polymer electrolyte on a support to form a cast membrane, ($A_2$) a drying step of drying the cast membrane, and ($A_3$) a solvent-removing step of removing a solvent in the dried membrane with a liquid that is miscible with the solvent of the ionic group-containing polymer electrolyte, and wherein the steps ($A_2$) and ($A_3$) are carried out without separating the membrane from the support.

[3] The method for producing a polymer electrolyte membrane according to [2], wherein in the drying step ($A_2$), the support on which the cast membrane is dried to form a self-supporting membrane is a polyethylene terephthalate film.

[4] The method for producing a polymer electrolyte membrane according to [2], wherein the support is a polyethylene terephthalate film.

[5] The method for producing a polymer electrolyte membrane according to any of [1] to [4], wherein the ionic group-containing polymer electrolyte has a repeating unit expressed by the general formula 1:

(general formula 1)

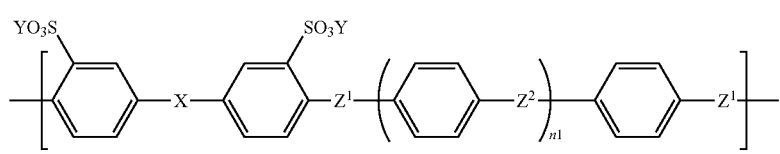

[wherein, X represents a —S(=O)₂— group or a —C(=O)— group, Y represents H or a monovalent cation, $Z^1$ represents either an O atom or an S atom, $Z^2$ represents any of an O atom, an S atom, a —C(CH₃)₂— group, a —C(CF₃)₂— group, a —CH₂— group, a cyclohexyl group, and a direct bond, and n1 represents an integer of 1 or more].

In a second invention, the inventors of the present invention have made intensive studies, and as a result, they have found that the above described problems can be resolved by means shown below and have achieved the present invention.

That is, the present invention has the following constitutions.

[6] A method for forming a polymer electrolyte membrane including ($A_1$) a casting step of casting an ionic group-containing polymer electrolyte solution on a support to form a cast membrane, ($A_2$) a drying step of evaporating a solvent from the cast membrane, and ($A_3$) a solvent-removing step of removing a solvent in the dried membrane by extracting the solvent with a liquid that is miscible with the solvent of the ionic group-containing polymer electrolyte, wherein the steps ($A_2$) and ($A_3$) are carried out without separating the membrane from the support, wherein the cast membrane is dried to form a self-supporting membrane having a solvent content of 15 to 30% by mass under the condition such that a relationship between a coating thickness coefficient T of the polymer electrolyte solution and a drying speed $R_1$ (g/m²·min) in the drying step ($A_2$) is within the range of the following formula (I):

$$2 \leq R_1 \cdot T \leq 56 \quad (I)$$

[wherein, $R_1$: drying speed (g/m²·min)

T: a coating thickness of the polymer electrolyte solution (μm)/300 (μm)].

[7] The method for forming a polymer electrolyte membrane according to [6], wherein a solvent-removing speed $R_2$ (g/m²·min) in the solvent-removing step ($A_3$) is set to 1 to 20 g/m² min to remove the solvent until a solvent content of less than 8% by mass is achieved.

[8] A method for producing a polymer electrolyte membrane, including (B) an acid treatment step of exchanging an ionic group to an acid type by bringing the polymer electrolyte membrane formed in [6] or [7] into contact with an inorganic acid-containing acidic liquid with adhering the polymer electrolyte membrane to a support, (C) an acid removal step of removing a free acid in the acid-treated membrane, and (D) a drying step of drying the acid-removed membrane, wherein the steps (B) to (D) are carried out without separating the polymer electrolyte membrane from the support.

[9] A method for producing a polymer electrolyte membrane, wherein an average pore diameter in the polymer electrolyte membrane obtained in [8] by a DSC method is 0.1 to 10 nm.

[10] The method for producing a polymer electrolyte membrane according to any of [6] to [9], wherein the ionic group-containing polymer electrolyte is a polyarylene ether compound containing constituent units represented by the general formulas (14) and (15):

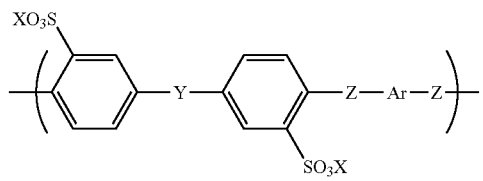

(general formula 14)

(wherein, Ar is a bivalent aromatic group, Y is a sulfone group or a ketone group, X is H and/or a monovalent cation species, and Z is at least one selected from a direct bond, an ether bond and a thioether bond);

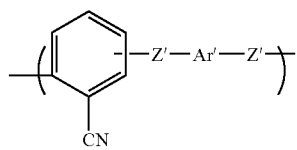

(general formula 15)

(wherein, Ar' is a bivalent aromatic group, and $Z^1$ is at least one selected from a direct bond, an ether bond and a thioether bond).

Advantages of the Invention

According to the first invention, even a very thin polymer electrolyte membrane having a thickness of 100 μm or less can be produced as a uniform polymer electrolyte membrane with less irregularity in thickness, less wrinkles and less unevenness on the entire membrane surface. In particular, it is effective in the case of a polymer electrolyte having a softening temperature of 90° C. or more, preferably 140° C. to 250° C. Further, according to the second invention, in a membrane closely adhering to a support and containing a solvent, transfer and diffusion of the solvent in the membrane to the membrane surface (opposite side of the support) can be controlled, and thus, stability of the membrane shape and reduction in fluctuation of a membrane shape can be realized, and further, stabilization of membrane characteristics and reduction in fluctuation of membrane characteristics are possible. Furthermore, even a very thin polymer electrolyte membrane having a thickness of 160 μm or less can be produced as a uniform polymer electrolyte membrane with less irregularity in thickness, less wrinkles and less unevenness on the entire membrane surface, and excellent in form stability. Since a pore diameter inside the membrane can be controlled, a polymer electrolyte membrane in which membrane characteristics, in particular, permeation performance, are stabilized can be produced. In particular, it is effective in the case of a polymer electrolyte having a softening temperature of 90° C. or more, preferably 140° C. to 250° C.

BEST MODE FOR CARRYING OUT THE INVENTION

The method for producing a polymer electrolyte membrane of the first invention includes (A) a membrane formation step of forming a membrane-form product of an ionic group-containing polymer electrolyte on a support, (B) an acid treatment step of exchanging the ionic group into an acid type by bringing the membrane into contact with an inorganic acid-containing acidic liquid, (C) an acid removal step of removing a free acid in the acid-treated membrane, and (D) a drying step of drying the acid-removed membrane.

As the membrane formation step (A) of forming a membrane-form product of an ionic group-containing polymer electrolyte on a support, a membrane (film-form molded article) can be formed by any method such as an extrusion method, a rolling method, or a casting method. Among these methods, a casting method of casting a solvent solution of an ionic group-containing polymer electrolyte on a support is preferable.

When the casting method is used, it is preferable that the membrane formation step (A) includes ($A_1$) a casting step of casting a solvent solution of an ionic group-containing polymer electrolyte on a support to form a cast membrane, ($A_2$) a drying step of drying the cast membrane, and ($A_3$) a solvent-removing step of removing a solvent in the dried membrane with a liquid that is miscible with the solvent of the ionic group-containing polymer electrolyte.

As the solvent of a polymer electrolyte in the casting step ($A_1$), a suitable solvent can be selected from aprotic polar solvents such as N,N-dimethylformamide, N,N-dimethylacetamide, dimethylsulfoxide, N-methyl-2-pyrrolidone, and hexamethylphosphoneamide, and alcohols such as methanol and ethanol, but is not limited thereto. These solvents may be used by mixing a plurality of them within a possible range. The concentration of a compound in the solution is preferably in the range of 0.1 to 50% by mass. When the concentration of a compound in the solution is less than 0.1% by mass, it tends to be hard to obtain a preferable molded article, and when the concentration of a compound is more than 50% by mass, processability tends to be deteriorated.

The method for producing a polymer electrolyte membrane of the second invention includes ($A_1$) a casting step of casting an ionic group-containing polymer electrolyte solution on a support to form a cast membrane, ($A_2$) a drying step of evaporating a solvent from the cast membrane, and ($A_3$) a solvent-removing step of removing a solvent in the dried membrane by extracting the solvent with a liquid that is miscible with the solvent of the ionic group-containing polymer electrolyte, wherein it is important that the steps ($A_2$) and ($A_3$) are carried out without separating the membrane from the support.

Also, it is characteristic that the cast membrane is dried to form a self-supporting membrane having a solvent content of 15 to 30% by mass under the condition such that a relationship between a coating thickness coefficient T of the polymer electrolyte solution and a drying speed $R_1$ (g/m²·min) measured by a method as described later in the drying step ($A_2$) is within the range of the following formula (I):

$$2 \leq R_1 \cdot T \leq 56 \quad (I)$$

[wherein, $R_1$: drying speed (g/m²·min)
T: a coating thickness of the polymer electrolyte solution (μm)/300 (μm)].

In a state where $R_1 \cdot T$ exceeds 56, bubble generation occurs, or only a surface portion of the cast membrane is rapidly dried, and thus, removal of the solvent in the support side (inside the membrane) after that may be difficult. In addition, when $R_1 \cdot T$ is less than 2, there is a problem in terms of productivity.

A preferable range of $R_1 \cdot T$ is 10 to 50, and $R_1 \cdot T$ in this range is preferable since occurrence of bubble generation due to drying and rapid dry and roughness of a membrane surface can be avoided, whereby a polymer electrolyte membrane excellent in quality can be provided. Also, this range is preferable from the viewpoint of balance between quality of the membrane and productivity.

When $R_1 \cdot T$ is in the range of 2 to 30, an average pore diameter (by a DSC method) in a polymer electrolyte membrane is in the range of 0.1 to 10 nm, and fluctuation in a pore diameter becomes small. Thus, other than from stability of a membrane, membrane characteristics such as improving a methanol permeation suppressing property while keeping ion conductivity are more likely to become preferable.

In order to make $R_1 \cdot T$ in the above described range, it is important to diffuse a solvent in the support side to a membrane surface smoothly without irregularity. This can be achieved by selecting appropriate conditions respectively depending on the atmospheric temperature of air and the like, the treatment time, the air volume, the velocity of wind, the coating thickness of a solution, the kind of a solvent, the kind of an electrolyte polymer, the amount of an ionic group, and the like.

For example, as the temperature, although it depends on a kind of a solvent to be used, a method of obtaining a self-supporting property by drying until a solvent content of a membrane becomes 15 to 30% by mass at a temperature of 100° C. or less of the boiling point of the solvent to be used, or a method of drying until a self-supporting property is obtained by further removing a solvent at a temperature up to 70° C. or less of the boiling point of the solvent at the time when a solvent content of the membrane in the support side becomes 15 to 30% by mass can be applied.

As the velocity of wind, when the wind is vertical flow to a coating membrane, it is preferable to be a comparatively gentle velocity of wind such as 0.5 m/min or 1.0 m/min from the viewpoint that uniformity of a membrane surface can be easily obtained. When the wind is parallel flow, a velocity of wind such as 10 m/min and 20 m/min is applicable as long as bubbles are not generated, since there is no physical collision to a coating membrane surface.

As the support of the first and second inventions, a resin film and a resin sheet of polyethylene, polyester, nylon, Teflon (registered trademark), etc, glass, and the like can be used, but it is not particularly limited as long as it is made of materials durable for a solvent containing water and an acid. Further, the support may be modified on its surface by corona treatment, mirror finish, etc.

The thickness of a solution at the time of casting in the first and second inventions is not particularly limited, but it is preferably 10 to 2500 μm. It is more preferable that the thickness is 50 to 1500 μm. When the thickness of the solution is smaller than 10 μm, there is a tendency that a form as a proton exchange membrane cannot be maintained, and when the thickness is larger than 2500 μm, there is a tendency that a nonuniform proton exchange membrane is likely to be formed.

As a method of controlling a casting thickness of a solution, known methods can be used. For example, the thickness can be controlled by achieving a constant thickness by using an applicator, a doctor blade, and the like, or it can be controlled by adjusting an amount or a concentration of a solution while making a cast area constant by using a glass petri dish. A cast solution can provide a more uniform membrane by adjusting a removal speed of a solvent. For example, in the case of heating, there is a method of heating at low temperature in an initial step, thereafter increasing the temperature. Further, in the case of immersion in a nonsolvent such as water, the coagulation speed of a compound can be adjusted by leaving a solution in the air or in an inert gas for an appropriate time.

The cast membrane on the support in the first and second inventions is sent to a drying step ($A_2$) together with the support. As a method of removing a solvent in the drying step ($A_2$), drying by a heating treatment or a depressurization treatment is preferable from the viewpoint of uniformity of a proton exchange membrane. In order to avoid decomposition and deterioration of a compound and a solvent, it is preferable to dry the membrane at a temperature as low as possible under reduced pressure. It is preferable that 70% or more of the solvent is removed and a cast membrane is dried until the membrane becomes to exhibit a self-supporting property.

Further, in the case where the viscosity of the solution is high, when casting is carried out at a high temperature while heating a support and the solution, the viscosity of the solution is lowered and thus casting can be easily performed.

The membrane obtained by drying a cast membrane until it becomes to exhibit a self-supporting property in the first and second inventions is, together with a support, further sent to a solvent-removing step ($A_3$) of removing a solvent in the dried membrane with a liquid that is miscible with a solvent of an ionic group-containing polymer electrolyte.

The liquid that is miscible with a solvent of an ionic group-containing polymer electrolyte is not particularly limited as long as the liquid is miscible with the solvent and can remove the solvent, and water is preferable.

The membrane formed in the membrane formation step (A) in the first and second inventions is treated in an acid treatment step (B) of exchanging an ionic group into an acid type by bringing the membrane into contact with an inorganic acid-containing acidic liquid together with a support.

As the inorganic acid in the acid treatment step (B), an aqueous solution of hydrochloric acid, nitric acid, sulfuric acid, etc. may be used. The temperature at the time of bringing the membrane into contact with an acidic aqueous solution is not particularly limited.

By bringing the membrane into contact with the acidic aqueous solution without separating the membrane from the support, the entire membrane surface is fixed with the support, swelling in the membrane plane direction is suppressed, and irregularity in thickness and generation of wrinkles can be reduced.

The acid-treated membrane undergoing the acid treatment step (B) in the first and second inventions is then passed through an acid removal step (C) of removing a free acid in the membrane, and further, the acid-removed membrane is dried in the drying step (D).

In order to remove an excess acid in the acid-treated membrane without separating the membrane from the support, it is preferable that the acid-treated membrane is brought into contact with water. The method of bringing the membrane into contact with water is not particularly limited, and examples thereof include a method of bringing the membrane in contact with running water such as shower, a method of immersing the membrane in water, and the like. In addition, contact with water may be repeatedly performed.

Also in the drying step (D) in the first and second inventions, moisture is removed without separating the polymer electrolyte membrane from the support. The drying method is not particularly limited, but drying with air is preferable. As the air drying method, wind may be applied to a polymer electrolyte membrane, or the polymer electrolyte membrane can also be dried by leaving without applying wind. Wind may be heated. Further, the polymer electrolyte membrane can be dried by applying heat from the support side.

The production method of the first and second inventions is characterized in that the steps (B) to (D) are carried out without separating the membrane from the support. Thereby, even in the step of bringing the membrane into contact with a solvent containing water, problems such as swelling and deformation of the membrane are not caused, which enables to obtain a uniform polymer electrolyte membrane with less irregularity in thickness, less wrinkles and less unevenness in the entire surface of the polymer electrolyte membrane.

The polymer electrolyte membrane of the first and second inventions can be formed to have any thickness according to an object, but the thickness is preferably as thin as possible in view of proton conductivity. Specifically, the thickness is preferably 3 to 200 μm, more preferably 5 to 150 μm, and most preferably 5 to 100 μm. When the thickness of the polymer electrolyte membrane is smaller than 3 μm, handling of the polymer electrolyte membrane is difficult and in the case of preparing a fuel cell, short circuit or the like tends to occur, and when the thickness is larger than 200 μm, a polymer electrolyte membrane is too tough, and handling thus tends to be difficult.

As a polymer forming the polymer electrolyte membrane in the first and second inventions, known polymer electrolytes can be used.

As an aromatic hydrocarbon ionic group-containing polymer, examples thereof include non-fluorine ionic conductive polymers having a structure containing at least one bonding groups selected from an ether bond, a sulfone bond, an imide bond, an ester bond, an amide bond, an urethane bond, a sulfide bond, a carbonate bond and a ketone bond with an aromatic group or an aromatic ring in the polymer main chain, and examples thereof include polymers introduced with at least one kind of a sulfonic acid group, a phosphonic acid group, a carboxyl group, and derivatives thereof in polymers containing at least one constituent components such as polysulfone, polyether sulfone, polyphenylene oxide, polyphenylene sulfide, polyphenylene sulfide sulfone, polyparaphenylene, a polyarylene polymer, polyphenyl quinoxaline, polyaryl ketone, polyether ketone, polybenzoxazole, polybenzthiazole, polybenzimidazole, and polyimide.

Ion conductivity of a polymer is exhibited by adding a functional group such as a sulfonic acid group, a phosphonic acid group, and a carboxyl group to the polymer. Among these, a functional group having a particularly effective action is a sulfonic acid group. Polysulfone, polyether sulfone, polyether ketone and the like described herein indicate a generic term of polymers having a sulfone bond, ether bond, and ketone bond in its molecular chain, and include polyether ketone ketone, polyether ether ketone, polyether ether ketoneketone, polyether ketone ether ketone ketone, and polyether ketone sulfone, and also are not limited to a specific polymer structure.

Among the above described polymers having functional groups, particularly a polymer having a sulfonic acid group on an aromatic ring can be obtained by reacting a suitable sulfonating agent to a polymer having a skeleton as described in the above examples. As such a sulfonating agent, effective examples include concentrated sulfuric acid and fuming sulfuric acid (for example, Solid State Ionics, 106, P. 216 (1998)), chlorosulfuric acid (for example, J. Polym. Sci., Polym. Chem., 22, p. 295 (1984)), a sulfur trioxide complex (for example, J. Polym. Sci., Polym. Chem., 22, p. 721 (1984), J. Polym. Sci., Polym. Chem., 23, p. 1231 (1985)), and the like, which are reported in examples of introduction of a sulfonic acid group into an aromatic hydrocarbon polymer. A reaction for obtaining the ionic group-containing polymer of the first and second inventions, in particular, a polymer in which ionic group is a sulfonic acid group can be carried out by selecting reaction conditions according to respective polymers using these reagents. In addition, a sulfonating agent, etc. described in Japanese Patent No. 2884189 can also be used.

The above described aromatic hydrocarbon ionic group-containing polymer can also be synthesized by using a monomer containing an acid group as at least one of monomers used for polymerization. For example, in a polyimide that is synthesized from an aromatic diamine and an aromatic tetracarboxylic acid dianhydride, an acid group-containing polyimide can be formed by using a diamine containing a sulfonic acid group or a phosphonic acid group as at least one of aromatic diamines. In the case of polybenzoxazole synthesized from an aromatic diaminediol and an aromatic dicarboxylic acid, polybenzthiazole synthesized from an aromatic diaminedithiol and an aromatic dicarboxylic acid, and polybenzimidazole synthesized from an aromatic tetramine and an aromatic dicarboxylic acid, an acid group-containing polybenzoxazole, polybenzthiazole, and polybenzimidazole can be formed by using a sulfonic acid group-containing dicarboxylic acid or a phosphonic acid group-containing dicarboxylic acid as at least one of aromatic dicarboxylic acids. Polysulfone, polyether sulfone, polyether ketone and the like synthesized from an aromatic dihalide and an aromatic diol can be synthesized by using a sulfonic acid group-containing aromatic dihalide or a sulfonic acid group-containing aromatic diol as at least one of monomers. At this time, using a sulfonic acid group-containing dihalide is more preferable than using a sulfonic acid group-containing diol since the polymerization degree is likely to be high, and heat stability of an acid group-containing polymer to be obtained is high.

An aromatic hydrocarbon ionic group-containing polymer is preferably polyarylene ether compounds and polyarylene compounds such as sulfonic acid group-containing polysulfone, polyether sulfone, polyphenylene oxide, polyphenylene sulfide, polyphenylene sulfide sulfone, and polyether ketone polymer.

In the first invention, among aromatic hydrocarbon ionic group-containing polymers, polymers having a repeating unit expressed by the general formula 1 are particularly preferable.

of an O atom, an S atom, a —C(CH$_3$)$_2$— group, a —C(CF$_3$)$_2$— group, a —CH$_2$— group, a cyclohexyl group, and a direct bond, and n1 represents an integer of 1 or more].

In the second invention, among the polyarylene ether compound and polyarylene compound, the following polymer is more preferable.

That is, a polyarylene ether compound containing constituent units represented by the general formulas (14) and (15) is more preferable.

(general formula 14)

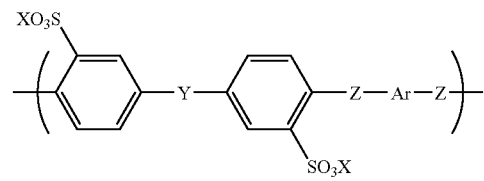

(wherein, Ar is a bivalent aromatic group, Y is a sulfone group or a ketone group, X is H and/or a monovalent cation species, and Z is at least one selected from a direct bond, an ether bond and a thioether bond);

(general formula 15)

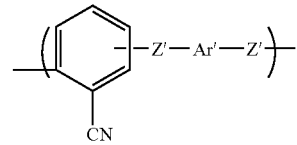

(wherein, Ar' is a bivalent aromatic group, and Z' is at least one selected from a direct bond, an ether bond and a thioether bond).

The ratio of constituent units expressed by the general formula (14) and the general formula (15) in a polymer (molar ratio) is preferably in the range of 0.3 to 3.5 meq/g as indicated by a sulfonic acid group content that can be calculated from polymer composition. When the ratio is less than 0.3 meq/g, there is a tendency that sufficient ion conductivity is not shown when used as an ion conducive membrane, and when the ratio is more than 3.5 meq/g, there is a tendency that membrane swelling becomes too large in the case where an ionic conductive membrane is kept in high temperature and high humidity conditions and the membrane is not suitable for use. More preferably, the ratio is 0.6 to 3.0 meq/g.

(general formula 1)

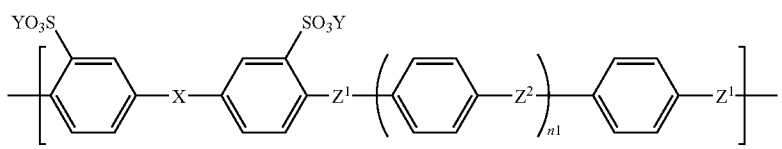

[wherein, X represents a —S(=O)$_2$— group or a —C(=O)— group, Y represents H or a monovalent cation, Z$^1$ represents either an O atom or an S atom, Z$^2$ represents any Also, among aromatic hydrocarbon ionic group-containing polymers, polymers having a repeating unit expressed by the general formula 16 are particularly preferable.

(general formula 16)

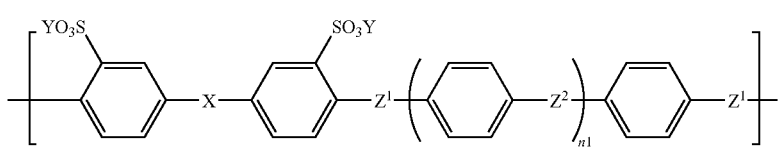

[wherein, X represents a —S(=O)$_2$— group or a —C(=O)— group, Y represents H or a monovalent cation, Z$^1$ represents either an O atom or an S atom, Z$^2$ represents any of an O atom, an S atom, a —C(CH$_3$)$_2$— group, a —C(CF$_3$)$_2$— group, a —CH$_2$— group, a cyclohexyl group, and a direct bond, and n1 represents an integer of 1 or more].

It is preferable that X is a —S(=O)$_2$— group in the general formulas 1 and 16 since solubility into a solvent is improved. It is preferable that X is a —C(=O)— group since a joining property to electrodes is further improved by lowering the softening temperature of the polymer, and a photo-crosslinking property can be imparted to an electrolyte membrane. When used as a polymer electrolyte membrane, it is preferable that Y is a H atom. However, when Y is a H atom, since the polymer is easily decomposed by heat, it is also possible to use an alkali metal salt of Na, K, or the like as Y at the time of processing such as production of an electrolyte membrane, and then to exchange Y to a H atom by an acid treatment after the process so as to obtain a polymer electrolyte membrane. It is preferable that Z$^1$ is an O atom since there are advantages such that coloring of a polymer is little, and raw materials are easily available. It is preferable that Z$^1$ is S since oxidation resistance is improved. n1 is preferably in the range of 1 to 30, and when n1 is 3 or more, a plurality of units having different n1 may be contained. Z$^2$ represents an O atom, an S atom, a —C(CH$_3$)$_2$— group, a —C(CF$_3$)$_2$— group, a —CH$_2$— group, a cyclohexyl group, or a direct bond, and it is preferable that Z$^2$ is an O atom or an S atom since a joining property is more improved. It is preferable that Z$^2$ is a direct bond since dimensional stability of the obtained polymer electrolyte membrane is improved. It is preferable that Z$^2$ is an O atom in the case where n1 is 3 or more since a joining property to an electrode catalyst layer when formed into a polymer electrolyte membrane is particularly improved.

It is preferable that the ionic group-containing polymers having a repeating unit expressed by the general formula 1 or general formula 14 further comprises a repeating unit expressed by the general formula 2.

(general formula 2)

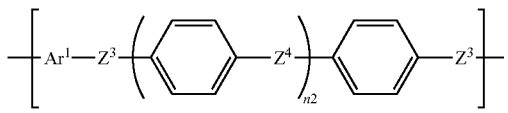

[wherein, Ar$^1$ represents a bivalent aromatic group, Z$^3$ represents either an O atom or an S atom, Z$^4$ represents any of an O atom, an S atom, a —C(CH$_3$)$_2$— group, a —C(CF$_3$)$_2$— group, a —CH$_2$— group, a cyclohexyl group, and a direct bond, and n2 represents an integer of 1 or more].

In the general formula 2, it is preferable that Z$^3$ is an O atom since there are advantages such that coloring of a polymer is little, and raw materials are easily available. It is preferable that Z$^3$ is an S atom since oxidation resistance is improved. n2 is preferably in the range of 1 to 30, and when n2 is 3 or more, a plurality of units having different n2 may be contained. Z$^4$ represents an O atom, an S atom, a —C(CH$_3$)$_2$— group, a —C(CF$_3$)$_2$— group, a —CH$_2$— group, a cyclohexyl group, or a direct bond, and it is preferable that Z$^4$ is an O atom or an S atom since a joining property is more improved. It is preferable that Z$^4$ is a direct bond since dimensional stability of the obtained polymer electrolyte membrane is improved. It is preferable that Z$^4$ is an O atom in the case where n2 is 3 or more since a joining property to an electrode catalyst layer when formed into a polymer electrolyte membrane is particularly improved.

When an ionic group-containing polymer constituting the polymer electrolyte membrane in the first invention is constituted with a repeating unit expressed by the general formula 1 and a repeating unit expressed by the general formula 2, the molar ratio between them is preferably in the range of 7:93 to 70:30. The molar ratio of 7:93 indicates that the number of moles of the repeating unit expressed by the general formula 2 is 93 when the number of moles of the repeating unit expressed by the general formula 1 is set to 7. The repeating unit expressed by the general formula 1 in an amount larger than in a molar ratio of 70:30 is not preferable since there may be a case where fuel permeability is large when formed into a polymer electrolyte membrane. The repeating unit expressed by the general formula 1 in an amount less than in a molar ratio of 7:93 is not preferable since proton conductivity is lowered and resistance is increased when formed into a polymer electrolyte membrane. More preferably, the molar ratio is in the range of 10:90 to 50:50. Further preferably, the molar ratio is in the range of 10:90 to 40:60. The ionic group-containing polymer in the first invention has an appropriate softening temperature by having repeating units expressed by the general formulas 1 and 2, and shows a preferable joining property with an electrode when formed into a polymer electrolyte membrane.

In the second invention, the general formula 1 can be replaced with the general formula 16, and the general formula 2 can be replaced with the general formula 17 in the above description.

Ar$^1$ in the general formulas 2 and 17 is preferably a bivalent aromatic group having an electron attractive group. Examples of the electron attractive group include a sulfone group, a sulfonyl group, a sulfonic acid group, a sulfonic acid ester group, a sulfonic acid amide group, a sulfonic acid imide group, a carboxyl group, a carbonyl group, a carboxylic acid ester group, a cyano group, a halogen group, a trifluoromethyl group, and a nitro group, but are not limited to these examples, and may be any known electron attractive groups.

A preferable structure of $Ar^1$ is the structures expressed by chemical formulas 3 to 6. The structure of the chemical formula 3 is preferable since solubility of a polymer can be enhanced. The structure of the chemical formula 4 is preferable since the softening temperature of a polymer is decreased to increase a joining property to an electrode and a photocrosslinking property is imparted. The structure of the chemical formula 5 or 6 is preferable since swelling of a polymer can be reduced, and the structure of the chemical formula 6 is more preferable. The structure of the chemical formula 6 is the most preferable among those of chemical formulas 3 to 6.

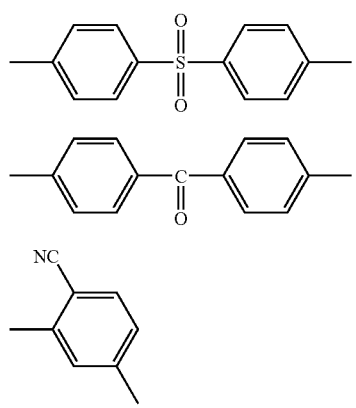

(chemical formula 3)

(chemical formula 4)

(chemical formula 5)

One further preferable embodiment of an ionic group-containing polymer constituting the polymer electrolyte membrane of the first invention is an ionic group-containing polymer in which the polymer electrolyte membrane is mainly constituted with a structure expressed by the general formula 1 and a structure expressed by the general formula 2, wherein $Z^1$ and $Z^2$ are both O atoms, and n1 is 3 or more in the general formula 1. It is preferable to use such an ionic group-containing polymer since a joining property to an electrode is particularly improved. In the second invention, the general formula 1 can be replaced with the general formula 16, and the general formula 2 can be replaced with the general formula 17 in the above description.

One further preferable embodiment of said ionic group-containing polymer is an ionic group-containing polymer in which $Z^3$ and $Z^4$ are both O atoms, and n2 is 3 or more in the general formulas 2 and 17. It is preferable to use such an ionic group-containing polymer since a joining property to an electrode is further improved.

One further preferable embodiment of an ionic group-containing polymer constituting the polymer electrolyte membrane of the first invention is an ionic group-containing polymer having a repeating unit expressed by the general formula 7, in addition to repeating units expressed by the general formulas 1 and 2. It is preferable that the ionic group-containing polymer further has a repeating unit expressed by the general formula 7, in addition to repeating units expressed by the general formulas 1 and 2, since form stability of a membrane can be enhanced when formed into a polymer electrolyte membrane.

One further preferable embodiment of an ionic group-containing polymer constituting the polymer electrolyte membrane of the second invention is an ionic group-containing polymer having a repeating unit expressed by the general formula 7, in addition to repeating units expressed by the general formulas 16 and 17. It is preferable that the ionic group-containing polymer further has a repeating unit expressed by the general formula 7, in addition to repeating units expressed by the general formulas 16 and 17, since form stability of a membrane when formed into a polymer electrolyte membrane can be enhanced.

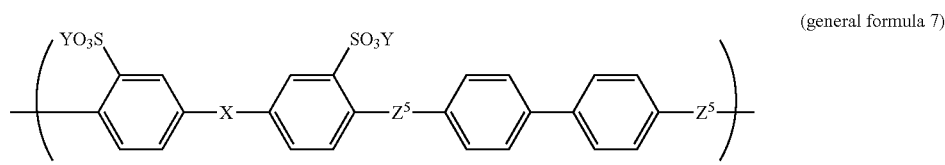

(general formula 7)

-continued

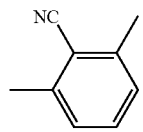

(chemical formula 6)

[wherein, X represents a —S(=O)$_2$— group or a —C(=O)— group, Y represents H or a monovalent cation, $Z^5$ represents either an O atom or an S atom].

It is preferable that X is a —S(=O)$_2$— group in the general formula 7 since solubility into a solvent is improved. It is preferable that X is a —C(=O)— group since a joining property to electrodes is further improved by lowering the softening temperature of the polymer, and a photo-crosslinking property can be imparted to an electrolyte membrane. When used as a polymer electrolyte membrane, it is preferable that Y is a H atom. However, when Y is a H atom, since the polymer is easily decomposed by heat, it is also possible to use an alkali metal salt of Na, K, or the like as Y at the time of processing such as production of an electrolyte membrane, and then to exchange Y to a H atom by an acid treatment after the process so as to obtain a polymer electrolyte membrane. It is preferable that $Z^5$ is an O atom since there are advantages such that coloring of a polymer is little, and raw materials are easily available. It is preferable that $Z^5$ is S since oxidation resistance is improved.

When an ionic group-containing polymer constituting the polymer electrolyte membrane of the first invention has repeating units expressed by the general formulas 1, 2 and 7, or when an ionic group-containing polymer constituting the polymer electrolyte membrane of the second invention has repeating units expressed by the general formulas 16, 17 and 7, it is preferable that $Z^1$ and $Z^2$ are O atoms or S atoms and n1 is 1 since a joining property to an electrode catalyst layer and form stability of the membrane when formed into a polymer electrolyte membrane are enhanced. Further, it is preferable that $Z^3$ and $Z^4$ are O atoms or S atoms and n2 is 1 since a joining property to an electrode catalyst layer and form stability of a membrane when formed into a polymer electrolyte membrane are enhanced.

It is more preferable that an ionic group-containing polymer constituting the polymer electrolyte membrane of the first invention has a repeating unit expressed by the general formula 8, in addition to repeating units expressed by the general formulas 1, 2 and 7, since a joining property to an electrode catalyst layer and form stability of a membrane can be greatly enhanced when formed into a polymer electrolyte membrane. It is similarly preferable that an ionic group-containing polymer constituting the polymer electrolyte membrane of the second invention has a repeating unit expressed by the general formula 8, in addition to repeating units expressed by the general formulas 16, 17 and 7.

(general formula 8)

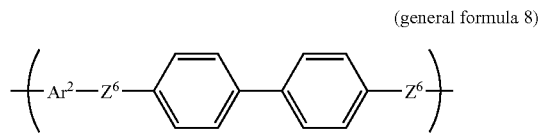

[wherein, $Ar^2$ represents a bivalent aromatic group, $Z^6$ represents either an O atom or an S atom].

It is preferable that $Z^6$ in the general formula 8 is an O atom since there are advantages such that coloring of a polymer is little, and raw materials are easily available. It is preferable that $Z^6$ is an S atom since oxidation resistance is improved. $Ar^2$ in the general formula 8 is preferably a bivalent aromatic group having an electron attractive group. Examples of the electron attractive group include a sulfone group, a sulfonyl group, a sulfonic acid group, a sulfonic acid ester group, a sulfonic acid amide group, a sulfonic acid imide group, a carboxyl group, a carbonyl group, a carboxylic acid ester group, a cyano group, a halogen group, a trifluoromethyl group, and a nitro group, but are not limited to these examples, and may be any known electron attractive groups.

A preferable structure of $Ar^2$ is the structures expressed by chemical formulas 3 to 6. The structure of the chemical formula 3 is preferable since solubility of an ionic group-containing polymer can be enhanced. The structure of the chemical formula 4 is preferable since the softening temperature of an ionic group-containing polymer is decreased to further increase a joining property to an electrode and a photo-crosslinking property is imparted. The structure of the chemical formula 5 or 6 is preferable since swelling of an ionic group-containing polymer can be reduced, and the structure of the chemical formula 6 is more preferable. The structure of the chemical formula 6 is the most preferable among those of chemical formulas 3 to 6.

When an ionic group-containing polymer constituting the polymer electrolyte membrane of the first invention has all repeating units respectively expressed by the general formulas 1, 2, 7 and 8, % by mole of respective repeating units and % by mole of other repeating units preferably satisfy the following mathematical formulas 1 to 3. When an ionic group-containing polymer constituting the polymer electrolyte membrane of the second invention has all repeating units respectively expressed by the general formulas 16, 17, 7 and 8, % by mole of respective repeating units and % by mole of other repeating units preferably satisfy the following mathematical formulas 1 to 3.

$0.9 \leq (n3+n4+n5+n6)/(n3+n4+n5+n6+n7) \leq 1.0$   mathematical formula 1

$0.05 \leq (n3+n4)/(n3+n4+n5+n6) \leq 0.7$   mathematical formula 2

$0.01 \leq (n4+n6)/(n3+n4+n5+n6) \leq 0.95$   mathematical formula 3

(wherein, n3 represents % by mole of the repeating unit expressed by the general formula 7, n4 represents % by mole of the repeating unit expressed by the general formula 1, n5 represents % by mole of the repeating unit expressed by the general formula 8, n6 represents % by mole of the repeating unit expressed by the general formula 2, and n7 represents % by mole of the other repeating units, respectively).

It is not preferable that (n3+n4+n5+n6)/(n3+n4+n5+n6+n7) is less than 0.9 since good characteristics cannot be obtained when formed into a polymer electrolyte membrane. More preferably, (n3+n4+n5+n6)/(n3+n4+n5+n6+n7) is in the range of 0.95 to 1.0.

It is not preferable that (n3+n4)/(n3+n4+n5+n6) is less than 0.05 since sufficient proton conductivity cannot be obtained when formed into a polymer electrolyte membrane. Further, it is not preferable that (n3+n4)/(n3+n4+n5+n6) is more than 0.9 since a swelling property is significantly increased when formed into a polymer electrolyte membrane. More preferably, (n3+n4)/(n3+n4+n5+n6) is in the range of 0.1 to 0.7.

It is preferable that (n3+n4)/(n3+n4+n5+n6) is in the range of 0.07 to 0.5, and more preferably 0.1 to 0.4. It is not preferable that (n3+n4)/(n3+n4+n5+n6) is more than 0.5 since there may be a case where fuel permeability is large. It is not preferable that (n3+n4)/(n3+n4+n5+n6) is less than 0.07 since proton conductivity is lowered and resistance is increased.

It is not preferable that (n4+n6)/(n3+n4+n5+n6) is less than 0.01 since a joining property to an electrolyte catalyst layer is lowered when formed into a polymer electrolyte membrane. It is not preferable that (n4+n6)/(n3+n4+n5+n6) is more than 0.95 since there may be a case where a swelling property becomes too large when formed into a polymer electrolyte membrane. Preferably, (n4+n6)/(n3+n4+n5+n6) is in the range of 0.05 to 0.8. Further preferably, (n4+n6)/(n3+n4+n5+n6) is in the range of 0.4 to 0.8.

In the ionic group-containing polymer in the first and second inventions, bonding modes of respective repeating units expressed by the above general formulas are not particularly limited, and may be any of random bonding, mutual boding, and bonding with a continuous block structure.

As a synthesis method of the ionic group-containing polymer in the first and second inventions, known methods can be employed, and although not particularly limited, preferable examples of raw material monomers used in the synthesis include monomers having structures expressed by the following general formulas 9 to 11. In addition, further using a monomer having a structure expressed by the general formula 12 is preferable since physical properties such as form stability of the membrane are improved.

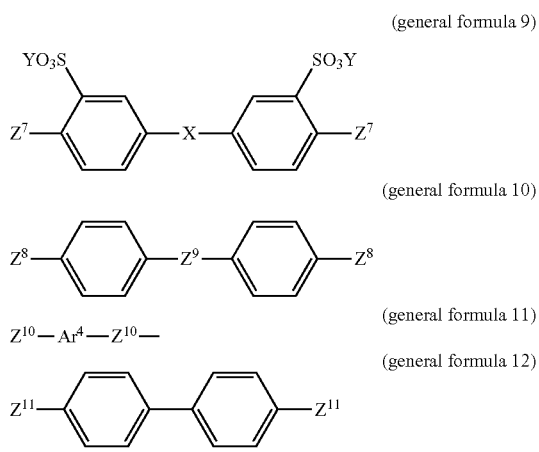

(general formula 9)

(general formula 10)

(general formula 11)

(general formula 12)

In the general formulas 9 to 12, X represents a —S(=O)$_2$— group or a —C(=O)— group, Y represents H or a monovalent cation, $Z^7$ and $Z^{10}$ each independently represent any of a Cl atom, a F atom, an I atom, a Br atom, and a nitro group, $Z^8$ and $Z^{11}$ each independently represent any of an OH group, an SH group, a —O—NH—C(=O)—R group, and an —S—NH—C(=O)—R group (wherein R represents an aromatic or aliphatic hydrocarbon group), $Z^9$ represents any of an O atom, an S atom, a —C(CH$_3$)$_2$— group, a —C(CF$_3$)$_2$— group, a —CH$_2$— group, and a cyclohexyl group, $Ar^4$ represents an aromatic group having an electron attractive group such as a sulfone group, a carbonyl group, a sulfonyl group, a phosphine group, a cyano group, a perfluoroalkyl group such as a trifluoromethyl group, a nitro group, a halogen group, and the like in a molecule.

Specific examples of a compound expressed by the general formula 9 include 3,3'-disulfo-4,4'-dichlorodiphenylsulfone, 3,3'-disulfo-4,4'-difluorodiphenylsulfone, 3,3'-disulfo-4,4'-dichlorodiphenyl ketone, 3,3'-disulfo-4,4'-difluorodiphenyl ketone, 3,3'-disulfobutyl-4,4'-dichlorodiphenylsulfone, 3,3'-disulfobutyl-4,4'-difluorodiphenylsulfone, 3,3'-disulfobutyl-4,4'-dichlorodiphenyl ketone, and 3,3'-disulfobutyl-4,4'-difluorodiphenyl ketone, and compounds in which sulfonic acid groups thereof are formed into salts with monovalent cation species. The monovalent cation species may be sodium, potassium, and other metal species and various amines, and are not limited thereto.

Among compounds expressed by the general formula 9, examples of the compounds in which sulfonic acid groups thereof are formed into salts include 3,3'-sodium disulfonate-4,4'-dichlorodiphenylsulfone, 3,3'-sodium disulfonate-4,4'-difluorodiphenylsulfone, 3,3'-sodium disulfonate-4,4'-dichlorodiphenyl ketone, 3,3'-sodium disulfonate-4,4'-difluorodiphenyl ketone, 3,3'-potassium disulfonate-4,4'-dichlorodiphenylsulfone, 3,3'-potassium disulfonate-4,4'-difluorodiphenylsulfone, 3,3'-potassium disulfonate-4,4'-dichlorodiphenyl ketone, and 3,3'-potassium disulfonate-4,4'-difluorodiphenyl ketone.

Specific examples of a compound expressed by the general formula 10 include 2,2-bis(4-hydroxyphenyl)propane, bis(4-hydroxyphenyl)methane, 2,2-bis(4-hydroxyphenyl)hexafluoropropane, 4,4'-thiobisbenezenethiol, 4,4'-oxybisbenzenethiol, bis(4-hydroxyphenyl)sulfide, 4,4'-dihydroxydiphenyl ether, and 1,1-bis(4-hydroxyphenyl)cyclohexane. Among them, 4,4'-thiobisbenezenethiol, bis(4-hydroxyphenyl)sulfide, 1,1-bis(4-hydroxyphenyl)cyclohexane, and an end hydroxyl group-containing phenylene ether oligomer (compound having a structure expressed by the following chemical formula 13) are preferable. In the chemical formula 13, n is an integer of 1 or more, and components having different n may be mixed.

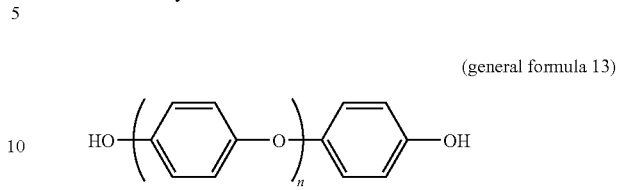

(general formula 13)

A monomer having a structure expressed by the general formula 10 can cause effects such as enhancing flexibility of an ionic group-containing polymer to suppress destruction due to deformation, and lowering a glass transition temperature to improve a joining property with an electrode catalyst layer.

Examples of a compound expressed by the general formula 11 include compounds having elimination groups in a nucleophilic substitution reaction such as halogen and a nitro group and an electron attractive group that activates the elimination groups in the same aromatic ring. Specific examples thereof include 2,6-dichlorobenzonitrile, 2,4-dichlorobenzonitrile, 2,6-difluorobenzonitrile, 2,4-difluorobenzonitrile, 4,4'-dichlorodiphenylsulfone, 4,4'-difluorodiphenylsulfone, 4,4'-difluorobenzophenone, 4,4'-dichlorobenzophenone, and decafluorobiphenyl, but are not limited thereto, and other compounds having activity in an aromatic nucleophilic substitution reaction such as aromatic dihalogen compounds, aromatic dinitro compounds, and aromatic dicyano compounds can also be used.

Examples of a compound expressed by the general formula 12 include 4,4'-biphenol and 4,4'-dimercaptobiphenol, and 4,4'-biphenol is preferable.

In the above described aromatic nucleophilic substitution reaction, other various activated dihalogen aromatic compounds and dinitro aromatic compounds, bisphenol compounds, and bisthiophenol compounds can be used as monomers together with compounds expressed by the general formulas 9 to 12.

Examples of other bisphenol compounds or bisthiophenol compounds include 9,9-bis(4-hydroxyphenyl)fluorene, 9,9-bis(3-methyl-4-hydroxyphenyl)fluorene, bis(4-hydroxyphenyl)sulfone, 1,1-bis(4-hydroxyphenyl)ethane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, hydroquinone, resorcin, bis(4-hydroxyphenyl)ketone, 1,4-benzenethiol, 1,3-benzenedithiol, phenolphthalein, and 10-(2,5-dihydroxyphenyl)-9,10-dihydro-9-oxa-10-phosphaphenanthrene-10-oxide, and other than these examples, various aromatic diols or various aromatic dithiols, which can be used in polymerization of polyarylene ether compounds by an aromatic nucleophilic substitution reaction, can also be used, and the other bisphenol compounds or bisthiophenol compounds are not limited to the above described compounds.

In the production method of an ionic group-containing polymer electrolyte membrane in the first invention, a polymer obtained from polymerization by a known aromatic nucleophilic substitution reaction in the presence of basic compounds using the above described activated dihalogen aromatic compounds or dinitro aromatic compounds, and aromatic diols or aromatic dithiols as raw materials is preferably used wherein such a polymer has a logarithmic viscosity of 0.1 to 2.0 dL/g and a softening temperature of 90° C. or more, more preferably 140 to 250° C.

EXAMPLES

The present invention will now be further specifically illustrated by using the following Examples although the present invention is not limited thereto. Each of measurements is performed as follows.

<Solution Viscosity of a Polymer>

A polymer powder was dissolved in N-methylpyrrolidone at a concentration of 0.5 g/dl, and a viscosity measurement was performed by using an Uberode type viscometer in a constant temperature bath at 30° C. to evaluate the logarithmic viscosity ln [ta/tb]/c (wherein ta denotes the number of seconds for dropping a sample solution, tb denotes the number of seconds for dropping only a solvent, and c denotes the polymer concentration).

<Softening Temperature of a Polymer>

An acid type membrane with a width of 5 mm was heated at 2° C./min from 50° C. to 250° C. with a chuck width of 10 mm, while giving a dynamic strain of 10 Hz, to measure a dynamic viscoelasticity by using Rheogel E-4000 (made by Toki Sangyo Co., Ltd.). The temperature of an inflexion point at which E' is largely lowered was defined as the softening temperature.

<Drying Speed>

Various dried membranes obtained by drying cast membranes on supports in various drying conditions were dissolved in dimethyl sulfoxide (DMSO), various solutions were subjected to NMR spectrum analysis in the condition of the number of integrations of 128 times by H-NMR to find a solvent amount, and an amount of evaporation per unit time and unit area was calculated from the residual solvent amount to a polymer mass to calculate a drying speed. The drying speed referred herein means a speed in a state where drying is progressed at a constant rate except for a material-preheating period due to heat and a falling rate drying period contributing to structure formation.

<Solvent-Removing Speed>

Various solvent-removed membranes obtained by removing a solvent in cast membranes on supports in various solvent-removing conditions were dissolved in dimethyl sulfoxide (DMSO), the solutions were subjected to NMR spectrum analysis in the condition of the number of integrations of 128 times by H-NMR to find a solvent amount, and a loss amount of the contained solvent per unit time and unit area was calculated from the solvent content to a polymer mass to calculate a solvent-removing speed. The solvent-removing speed referred herein means a speed in a state where a liquid that is miscible with a solvent of the above described ionic group-containing polymer electrolyte and a solvent in the ionic group-containing polymer electrolyte membrane contained after the drying step are exchanged to each other at a constant rate.

<Thickness of an Electrolyte Membrane>

The thickness of a polymer electrolyte membrane was measured by using a commercially available micrometer (Mitutoyo micrometer 0.001 mm) after separating the membrane from a support. Thicknesses at 20 positions were measured on a sample cut into a size of 5×5 cm, which is obtained from a polymer electrolyte membrane stood still for 24 hours or more in a measurement room controlled at room temperature of 20° C. and a humidity of 30±5 RH %, the mean value of the thicknesses was defined as the thickness and the degree of irregularity in thicknesses was indicated with a standard deviation value.

<Unevenness Measurement of an Electrolyte Membrane>

Unevenness of a polymer electrolyte membrane was measured by using a commercially available three dimensional non-contact surface shape measurement device (Micromap made by Ryoka Systems Inc.). A polymer electrolyte membrane stood still for 24 hours or more in a measurement room controlled at room temperature of 20° C. and a humidity of 30±5 RH % was cut out into a size of 3×3 cm, and the shapes of the both surfaces thereof were observed to measure a difference in height between the maximum convex part and the maximum concave part.

<Mean Pore Diameter by DSC Method>

An ion exchange membrane was immersed in water at 20° C. for 2 days, and 30 to 50 mg thereof was then sampled and filled in a sealed type aluminum pan for a differential scanning calorimeter (DSC) to be crimped. At this time, water attached to the surface was wiped out by Kimwipe to be removed.

As a temperature program of DSC, the temperature was firstly cooled from room temperature to −100° C. at a rate of 50° C./min, and retained at −100° C. for 10 minutes. Then, the temperature was increased up to 15° C. at a rate of 2.5° C./min, and a difference between a melting temperature of bulk water appearing at the time of temperature increase and a melting point of water causing lowering of a coagulation point was calculated to express the difference as $\Delta T$. A pore diameter was calculated by the following formula according to the pore theory from the obtained $\Delta T$, and a difference R4 in pore diameter between maximum diameters and minimum diameters of ten samples was measured.

Pore diameter $r(Å)=164/\Delta T$

<Ion-Exchange Capacity (Acid Type)>

As an ion-exchange capacity (IEC), an amount of an acid type functional group present in an ion exchange membrane was measured. Firstly, for sample adjustment, a sample piece (5×5 cm) was dried for 2 hours in a nitrogen gas flow in an oven at 80° C. and left to cool for 30 minutes in a desiccator filled with silica gel, and a dry mass (Ws) was then measured. Then, 200 mL of an aqueous (ultrapure water) solution of 1 M (mole/liter) sodium chloride and the sample after weighing were placed in a 200 mL-sealed type glass bottle and stirred at room temperature for 24 hours with being sealed. Then, 30 mL of the solution was taken out, and subjected to neutralizing titration with 10 mM (mole/liter) of an aqueous sodium hydroxide solution (commercially available standard solution), and IEC was determined by using the following formula from the titration amount (T).

$IEC(meq/g)=10\ T/(30\ Ws)\times 0.2$ (wherein a unit of T: mL, a unit of Ws: g)

<Ion Conductivity>

An ion conductivity $\sigma$ was measured as follows.

Platinum wires (diameter: 0.2 mm) were pushed against a surface of a strip-form membrane sample on a self-made measurement probe (made of a tetrafluoroethylene resin), and the sample was retained in water at 25° C., and an impedance between the platinum wires was measured by using 1250 FREQUENCY RESPONSE ANALYSER made by SOLARTRON. Measurement was preformed varying a distance between electrodes, and the electrical conductivity cancelling the contact resistance between the membrane and the platinum wires was calculated from a gradient plotting a resistance value estimated from the distance between electrodes and C-C plot. The distances between electrodes were respectively set to 1.5 cm in water at 25° C. and 1 cm at 80° C. and 95% RH.

Ion conductivity [S/cm]=1/membrane width [cm]×
membrane thickness [cm]×gradient between
resistance electrodes [Q/cm]

Further, the above described analysis was carried out on ten samples and the difference R5 between the maximum and the minimum was measured.

<Methanol Permeation Rate and Methanol Permeation Coefficient>

A methanol permeation rate and a methanol permeation coefficient of a proton exchange membrane were measured by the following method.

A proton exchange membrane immersed in an aqueous methanol solution having a concentration of 5 M (mole/liter) adjusted at 25° C. (wherein in preparation of an aqueous methanol solution, commercially available methanol of a reagent special grade and ultrapure water (18 MΩ·cm) were used) for 24 hours was pinched between H-shaped cells, 100 mL of the aqueous methanol solution with a concentration of 5 M was injected into one side of the cells and 100 mL of ultrapure water was injected into the other cell, and while stirring the cells in both sides at 25° C., the amount of methanol diffusing in ultrapure water through the proton exchange membrane was calculated by measuring with gas chromatography (an area of the proton exchange membrane was 2.0 cm$^2$). That is, the methanol permeation rate and the methanol permeation coefficient were calculated by using the following formula from the methanol concentration change rate [Ct] (mmol/L/s) of the cells containing ultrapure water.

Methanol permeation rate [mmol/m$^2$/s]=(Ct[mmol/L/s]×0.1 [L])/2×10$^{-4}$ [m$^2$]

Methanol permeation coefficient [mmol/m$^2$/s]=methanol permeation rate [mmol/m$^2$/s]×membrane thickness [m]

Further, the above described analysis was carried out on ten samples and the difference R6 between the maximum and the minimum was measured.

Example 1

A container was charged with 778 g of 3,3'-disulfo-4,4'-dichlorodiphenylsulfone disodium salt, 553 g of 2,6-dichlorobenzonitrile, 893 g of 4,4'-biphenol, 762 g of potassium carbonate, and 5621 g of N-methyl-2-pyrrolidone, the mixture was stirred at 150° C. for 1 hour under a nitrogen atmosphere, then, the reaction temperature was increased to 200° C. and the reaction was continued aiming for sufficiently increasing the viscosity of the system. After left standing to cool, the reaction product was precipitated in a strand form in water and the obtained polymer was washed in water for 40 hours and then dried. The logarithmic viscosity of this polymer was 1.05 dL/g, and the softening temperature was 245° C.

Then, a polymer solution was prepared from this polymer using N-methyl-2-pyrrolidone as a solvent so as to have a polymer concentration of 25% by mass. The prepared solution was continuously cast on a polyethylene terephthalate film that is a support at 20° C. so as to have a thickness of 200 μm by a blade coater and dried at a temperature of 140° C. for 30 minutes, and a polymer membrane wherein the cast membrane became to indicate a self-supporting property by drying was obtained in a state of closely adhering to the support. Subsequently, the polymer membrane was immersed in an aqueous 20 mass % sulfuric acid solution at 30° C. for 10 minutes without separating the polymer membrane from the support, then immersed in pure water at 30° C. for 40 minutes without separating the polymer membrane from the support, and further, dried with air at 25° C. for 30 minutes without separating the polymer membrane from the support. Then, the polymer membrane was separated from the support to obtain a polymer electrolyte membrane.

Example 2

The polymer membrane cast on the support and dried by the method described in Example 1 was immersed in pure water at 30° C. for 20 minutes without separating from the support, then immersed in an aqueous sulfuric acid solution and pure water in the same manner as in the method described in Example 1, and dried with air to obtain a polymer electrolyte membrane.

Comparative Example 1

The polymer membrane cast on the film support and dried by the method described in Example 1 was separated from the support, and only the polymer membrane was then immersed in an aqueous sulfuric acid solution and pure water, and dried with air to obtain a polymer electrolyte membrane in the same manner as in the method described in Example 1. But a large number of wrinkles were generated and the membrane was not worth evaluation.

Comparative Example 2

The polymer membrane cast on the film support and dried by the method described in Example 1 was separated from the support, and only the polymer membrane was then immersed in an aqueous sulfuric acid solution and pure water, fixed to a metal frame, and dried with air to obtain a polymer electrolyte membrane in the same manner as in the method described in Example 1. Even though wrinkles generated at the time of immersion in an aqueous sulfuric acid solution and pure water decreased by fixing the membrane to a metal frame, trace remained.

Comparative Example 3

The polymer membrane cast on the support and dried in the method described by Example 1 was immersed in an aqueous sulfuric acid solution and pure water without separating from the support, then the polymer membrane was separated from the support and only the polymer membrane was dried with air to obtain a polymer electrolyte membrane.

Values of physical properties of Examples 1 and 2 and Comparative Examples 1 to 3 are shown in Table 1.

TABLE 1

|  | wrinkle | thickness (μm) | standard deviation of thickness | difference in height between the convex part and the concave part (μm) |
|---|---|---|---|---|
| Example 1 | no wrinkle | 31 | 0.51 | 0.6 |
| Example 2 | no wrinkle | 30 | 0.42 | 0.5 |
| Comparative Example 1 | large number of wrinkles | | | |

TABLE 1-continued

| | wrinkle | thickness (μm) | standard deviation of thickness | difference in height between the convex part and the concave part (μm) |
|---|---|---|---|---|
| Comparative Example 2 | trace remained | 28 | 1.3 | 1.0 |
| Comparative Example 3 | no wrinkle | 31 | 0.67 | 3.0 |

Example 3

A polymer having the logarithmic viscosity of 1.02 dl/g and the softening temperature of 225° C. was obtained in the same manner as in Example 1 except for using 800.0 g of 3,3'-sodium disulfonate-4,4'-dichlorodiphenylsulfone (abbreviated symbol: S-DCDPS) in which bonding water was removed, 356.5 g of 2,6-dichlorobenzonitrile (abbreviated symbol: DCBN), 606.5 g of 4,4'-biphenol (abbreviated symbol: BP), 96.9 g of 4,4'-thiobisphenol (abbreviated symbol: BPS), 562.7 g of potassium carbonate, and 4624.3 g of N-methyl-2-pyrrolidone (abbreviated symbol: NMP) as raw materials.

Further, a polymer electrolyte membrane was obtained in the same manner as the method described in Example 1.

Comparative Example 4

The polymer obtained in Example 3 was used to obtain a polymer electrolyte membrane in the same manner as in the method described in Comparative Example 1. But a large number of wrinkles were generated and the membrane was not worth evaluation.

Comparative Example 5

The polymer obtained in Example 3 was used to obtain a polymer electrolyte membrane in the same manner as in the method described in Comparative Example 2. Even though wrinkles generated at the time of immersion in an aqueous sulfuric acid solution and pure water decreased by fixing the membrane to a metal frame, a trace remained.

Comparative Example 6

The polymer obtained in Example 3 was used to obtain a polymer electrolyte membrane in the same manner as in the method described in Comparative Example 3.

Values of physical properties of Example 3 and Comparative Examples 4 to 6 are shown in Table 2.

TABLE 2

| | wrinkle | thickness (μm) | standard deviation of thickness | difference in height between the convex part and the concave part (μm) |
|---|---|---|---|---|
| Example 3 | no wrinkle | 30 | 0.59 | 0.7 |
| Comparative Example 4 | large number of wrinkles | | | |
| Comparative Example 5 | trace remained | 30 | 1.5 | 1.1 |
| Comparative Example 6 | no wrinkle | 31 | 0.70 | 3.2 |

Example 4

A polymer having the logarithmic viscosity of 0.63 dl/g and the softening temperature of 152° C. was obtained in the same manner as in Example 1 except for using 310.0 g of dried S-DCDPS, 253.3 g of DCBN, 1156.6 g of an end hydroxyl group-containing phenylene ether oligomer (SPECIANOL DPE-PL; made by DIC Corporation, a mixture containing components expressed by the chemical formula 13 wherein n is 1 to 8 and a mean value of n is 5) (abbreviated symbol: DPE), 319.8 g of potassium carbonate, 5164.3 g of NMP and changing the reaction time to 8 hours.

Further, a polymer electrolyte membrane was obtained in the same manner as in the method described in Example 1.

Comparative Example 7

The polymer obtained in Example 4 was used to obtain a polymer electrolyte membrane in the same manner as in the method described in Comparative Example 1. But a large number of wrinkles were generated and the membrane was not worth evaluation.

Comparative Example 8

The polymer obtained in Example 4 was used to obtain a polymer electrolyte membrane in the same manner as in the method described in Comparative Example 2. Even though wrinkles generated at the time of immersion in an aqueous sulfuric acid solution and pure water decreased by fixing the membrane to a metal frame, trace remained.

Comparative Example 9

The polymer obtained in Example 4 was used to obtain a polymer electrolyte membrane in the same manner as in the method described in Comparative Example 3.

Values of physical properties of Example 4 and Comparative Examples 7 to 9 are shown in Table 3.

TABLE 3

| | wrinkle | thickness (μm) | standard deviation of thickness | difference in height between the convex part and the concave part (μm) |
|---|---|---|---|---|
| Example 4 | no wrinkle | 30 | 0.48 | 0.4 |
| Comparative Example 7 | large number of wrinkles | | | |
| Comparative Example 8 | trace remained | 29 | 1.2 | 1.0 |

TABLE 3-continued

| | wrinkle | thickness (μm) | standard deviation of thickness | difference in height between the convex part and the concave part (μm) |
|---|---|---|---|---|
| Comparative Example 9 | no wrinkle | 31 | 0.64 | 2.9 |

Example 5

A polymer was synthesized in the same manner as in Example 1 using 721 g of a 3,3'-disulfo-4,4'-dichlorodiphenyl ketone disodium salt in place of 778 g of 3,3'-disulfo-4,4'-dichlorodiphenylsulfone disodium salt. The logarithmic viscosity of the obtained polymer was 0.99 dL/g. A polymer electrolyte membrane was prepared in the same manner as in Example 1 to form a good membrane without wrinkles.

Comparative Example 10

A polymer electrolyte membrane was prepared using the polymer obtained in Example 5 in the same manner as in Comparative Example 1. The membrane had apparently a large amount of wrinkles.

Example 6

0.60 g of 9,9-bis(4-hydroxyphenyl)fluorene, 1.00 g of bisphenol S, 1.45 g of difluorodiphenylsulfone, and 0.91 g of calcium carbonate were weighed into a 50 ml-four necked flask, and 20 ml of NMP was added under a nitrogen gas flow, and the reaction temperature was set at around 175° C. to continue the reaction for about 5 hours. After left standing to cool, the reaction product was reprecipitated in about 100 ml of methanol and subjected to water washing treatments three times using a mixer to obtain a polymer. A logarithmic viscosity of the obtained polymer was 0.58 dL/g. The polymer sample was stirred with concentrated sulfuric acid (98%) at room temperature by a magnetic stirrer to carry out a sulfonating reaction. After the reaction, a sulfuric acid solution was charged in excess ice water to terminate the reaction, and the generated precipitate was taken by filtration, and washed with water to obtain a sulfonic acid group-containing polymer. A polymer electrolyte membrane was prepared using this polymer in the same manner as in Example 1 to form a good membrane without wrinkles.

Comparative Example 11

A polymer electrolyte membrane was prepared using the polymer obtained in Example 6 in the same manner as in Comparative Example 1. The membrane had a large amount of wrinkles.

Example 7

15 g of 3,3',4,4'-tetraminodiphenylsulfone, 14 g of monosodium 2,5-dicarboxybenzenesulfonate, 205 g of polyphosphoric acid (containing 75% of phosphorus pentoxide), and 164 g of phosphorus pentoxide were weighed in a polymerization container. Nitrogen was flowed and the temperature was increased to 100° C. while gently stirring on an oil bath. After retaining at 100° C. for 1 hour, the temperature was increased to 150° C. and retained for 1 hour, and the temperature was increased to 200° C. and polymerization was carried out for 4 hours. The polymerized product was stood to cool after completion of the polymerization, water was added to take out the polymerized product. The polymer was repeatedly washed with water three times by using a household mixer, and sodium carbonate was added to the polymer immersed in water after the repeated washing for neutralization, and washing with water was further repeated to confirm that the pH of the washing solution was neutral and did not change. The obtained polymer was dried under reduced pressure at 80° C. overnight. A logarithmic viscosity of the obtained polymer was 1.68 dL/g. The obtained polymer and NMP were weighed so as to make the polymer concentration 25% by mass, and heated to 170° C. on an oil bath while stirring to dissolve the polymer. A polymer electrolyte membrane was prepared using the obtained solution in the same manner as in Example 1 to form a good membrane without wrinkles.

Comparative Example 12

A polymer electrolyte membrane was prepared using the polymer obtained in Example 7 in the same manner as in Comparative Example 1. The membrane had a large amount of wrinkles and large irregularity in thickness.

Example 8

1.83 g of 3,3',4,4'-tetraminodiphenylsulfone, 0.53 g of monosodium 2,5-dicarboxybenzenesulfonate, 1.13 g of 3,5-dicarboxyphenylphosphonate, 25 g of polyphosphoric acid (containing 75% of phosphorus pentoxide), and 20 g of phosphorus pentoxide were weighed in a polymerization container. Nitrogen was flowed and the temperature was increased to 100° C. while gently stirring on an oil bath. After retaining at 100° C. for 1 hour, the temperature was increased to 150° C. and retained for 1 hour, and the temperature was increased to 200° C. and polymerization was carried out for 6 hours. The polymerized product was stood to cool after completion of the polymerization, water was added to take out the polymerized product. The polymer was repeatedly washed with water three times by using a household mixer, and sodium carbonate was added to the polymer immersed in water after the repeated washing for neutralization, and washing with water was further repeated to confirm that the pH of the washing solution was neutral and did not change. The obtained polymer was dried under reduced pressure at 80° C. overnight. A logarithmic viscosity of the obtained polymer was 1.31 dL/g. The obtained polymer was dissolved with N-methyl-2-pyrrolidone (NMP) on an oil bath so as to be 25% by mass concentration. A polymer electrolyte membrane was prepared using the obtained solution in the same manner as in Example 1 to form a good membrane without wrinkles.

Comparative Example 13

A polymer electrolyte membrane was prepared using the polymer obtained in Example 8 in the same manner as in Comparative Example 1. The membrane had a large amount of wrinkles.

Even in ultra thin membranes with a thickness of about 30 μm of Examples 1 to 8, no wrinkle was generated and irregularity in thickness and difference in height between the convex part and the concave part were also small, and it was confirmed that these membranes were good as polymer electrolyte membranes. On the other hand, in Comparative Examples 2, 5 and 8, generated wrinkles could be reduced in the drying step, but irregularity in thickness was large. It can be assumed that wrinkles were not sufficiently reduced only by fixing at the time of drying and irregularity in thickness thus remained. In Comparative Examples 3, 6 and 9, no wrinkle was generated and irregularity in thickness was also small, but difference in height between the convex part and the concave part was a high value. This indicates that the thickness of the polymer electrolyte membrane was the same but the membrane was undulant.

Example 9

A container was charged with 579.1 g of 3,3'-disulfo-4,4'-dichlorodiphenylsulfone disodium salt, 675.4 g of 2,6-dichlorobenzonitrile, 941.9 g of 4,4'-biphenol, 803.2 g of potassium carbonate, and 5438.9 g of N-methyl-2-pyrrolidone, the mixture was stirred at 150° C. for 1 hour under a nitrogen atmosphere, then, the reaction temperature was increased to 200° C. and the reaction was continued aiming for sufficiently increasing the viscosity of the system. After left standing to cool, the reaction product was precipitated in a strand form in water and the obtained polymer was washed in water for 40 hours and then dried. The logarithmic viscosity of this polymer was 1.11 dL/g, and a softening temperature was 245° C.

Then, a polymer solution was prepared from this polymer using N-methyl-2-pyrrolidone as a solvent so as to have a polymer concentration of 27% by mass. The prepared solution was continuously cast on a polyethylene terephthalate film that is a support at a temperature of 25° C. so as to have coating thicknesses of the polymer solution of 300 μm, 450 μm, or 600 μm by a blade coater, and dried in the drying conditions shown in Tables 4 to 6 and states of the membranes that came to show a self-supporting property were examined. Further, dried membranes were taken to measure solvent contents in respective membranes.

$R_1$: drying speed (g/m²·min) of the membrane was obtained based on a residual solvent content, and $R_1 \cdot T$ was calculated.

The obtained results are shown in Tables 4 to 6.

In the tables, membrane formation states (appearance of membranes, surface quality) after the drying step ($A_2$) were evaluated in the following three grades.

○: There is no bubble generation and undulation, and a surface state is good.

Δ: There is no bubble generation and undulation, but irregularity in thickness is recognized.

x: There is bubble generation and undulation, and both of a surface state and irregularity in thickness are poor.

TABLE 4

| | temperature of hot air to be blown to the coating membrane surface [° C.] constant temperature at 80° C. Example No. or Comparative Example No. | | | | | | | | |
|---|---|---|---|---|---|---|---|---|---|
| | Example 9 | | | | Comparative Example 14 | | | | |
| | 1 | 2 | 3 | 4 | 1 | 2 | 3 | 4 | 5 |
| velocity of wind at the coating membrane surface [m/min] | | 5 | | 10 | 10 | | | 20 | |
| coating thickness [μm] | 300 | 450 | 600 | 300 | 450 | 600 | 300 | 450 | 600 |
| drying time [min] | 20 | 30 | 60 | 15 | 20 | 45 | 10 | 15 | 30 |
| solvent content after drying [% by mass] | 26.4 | 27.7 | 29.6 | 27.3 | 33.2 | 35.1 | 34.1 | 39.9 | 40.2 |
| drying speed $R_1$ [g/m² · min] | 39 | 33 | 28 | 47 | 45 | 41 | 58 | 41 | 43 |
| $R_1 \cdot T$ [g/m² · min] | 39 | 49.5 | 56 | 47 | 67.5 | 82 | 58 | 61.5 | 86 |
| membrane surface quality after drying | ○ | ○ | ○ | ○ | Δ | x | Δ | Δ | x |
| membrane thickness [μm] | 62 | 126 | 155 | 64 | 128 | 156 | 60 | 131 | 172 |
| standard deviation of membrane thickness | 0.2 | 0.4 | 2.4 | 0.3 | 6.6 | 6.3 | 5.2 | 8.4 | 9.2 |
| difference R3 in height between the convex part and the concave part on the membrane [μm] | 0.4 | 7.1 | 11.2 | 0.4 | 17.9 | 32.3 | 2.4 | 33.7 | 43.2 |

TABLE 5

| | temperature of hot air to be blown to the coating membrane surface [° C.] constant temperature at 100° C. Example No. or Comparative Example No. | | | | | | | | |
|---|---|---|---|---|---|---|---|---|---|
| | Example 9 | | | | | Comparative Example 14 | | | |
| | 5 | 6 | 7 | 8 | 9 | 6 | 7 | 8 | 9 |
| velocity of wind at the coating membrane surface [m/min] | | 0.5 | | | 5 | 5 | | 10 | |
| coating thickness [μm] | 300 | 450 | 600 | 300 | 450 | 600 | 300 | 450 | 600 |
| drying time [min] | 30 | 60 | 90 | 20 | 30 | 60 | 15 | 20 | 45 |
| solvent content after drying [% by mass] | 21.1 | 22.8 | 24.4 | 23.9 | 28.8 | 31.6 | 29.3 | 35 | 33.8 |

TABLE 5-continued temperature of hot air to be blown to the coating membrane surface [° C.]
constant temperature at 100° C.
Example No. or Comparative Example No.

| | Example 9 | | | | | Comparative Example 14 | | | |
|---|---|---|---|---|---|---|---|---|---|
| | 5 | 6 | 7 | 8 | 9 | 6 | 7 | 8 | 9 |
| drying speed $R_1$ [g/m² · min] | 24 | 24 | 27 | 44 | 32 | 30 | 61 | 66 | 62 |
| $R_1 \cdot T$ [g/m² · min] | 24 | 36 | 54 | 44 | 48 | 60 | 61 | 99 | 124 |
| membrane surface quality after drying | ○ | ○ | ○ | ○ | ○ | Δ | Δ | x | x |
| membrane thickness [µm] | 57 | 97 | 143 | 62 | 107 | 159 | 74 | 133 | 175 |
| standard deviation of membrane thickness | 0.1 | 0.2 | 2.8 | 0.6 | 0.8 | 6.3 | 5.9 | 7.9 | 8.8 |
| difference R3 in height between the convex part and the concave part on the membrane [µm] | 0.2 | 4.4 | 8.1 | 0.4 | 8.5 | 16.3 | 3.2 | 18.2 | 28.7 |

TABLE 6 temperature of hot air to be blown to the coating membrane surface [° C.]
constant temperature at 110° C.
Example No. or Comparative Example No.

| | Example 9 | | | | | Comparative Example 14 | | | |
|---|---|---|---|---|---|---|---|---|---|
| | 10 | 11 | 12 | 13 | 14 | 10 | 11 | 12 | 13 |
| velocity of wind at the coating membrane surface [m/min] | | 0.1 | | 0.5 | | 0.5 | | 5 | |
| coating thickness [µm] | 300 | 450 | 600 | 300 | 450 | 600 | 300 | 450 | 600 |
| drying time [min] | 60 | 90 | 120 | 30 | 60 | 90 | 20 | 30 | 60 |
| solvent content after drying [% by mass] | 18.5 | 21.7 | 26.6 | 21.6 | 22 | 18.9 | 21.4 | 21.2 | 28.8 |
| drying speed $R_1$ [g/m² · min] | 14.7 | 19.7 | 18.4 | 24.4 | 37 | 42 | 62 | 58 | 54 |
| $R_1 \cdot T$ [g/m² · min] | 14.7 | 29.55 | 36.8 | 24.4 | 55.5 | 84 | 62 | 87 | 108 |
| membrane surface quality after drying | ○ | ○ | ○ | ○ | ○ | Δ | x | x | x |
| membrane thickness [µm] | 55 | 93 | 149 | 64 | 99 | 101 | 62 | 103 | 152 |
| standard deviation of membrane thickness | 0.1 | 2.1 | 3.8 | 0.7 | 4.2 | 10.2 | 3.2 | 5.5 | 9.7 |
| difference R3 in height between the convex part and the concave part on the membrane [µm] | 0.2 | 4.6 | 6.6 | 0.4 | 5.9 | 8.3 | 3.3 | 10.2 | 28.4 |

Membranes obtained in Tables 4 to 6 were successively subjected to treatments of solvent-removal by immersion in pure water, exchange into an acid type of an ionic group by immersion into an aqueous 20 mass %-sulfuric acid solution, removal of free acid by immersion in pure water, and drying with air at 25° C. in this order in conditions shown in Table 7 without separating the polymer membranes from supports according to the coating thickness. Then, the polymer membranes were separated from the supports to obtain polymer electrolyte membranes.

Evaluation results of the obtained polymer electrolyte membranes (Examples and part of Comparative Examples) are shown in Tables 8 to 10.

In the tables, appearance and surface quality of membranes after the drying step (D) were evaluated in the following three grades.

○: There is no trace of water drop, undulation and wrinkle, and a surface state is good.

Δ: There is no trace of water drop, undulation and wrinkle, but irregularity in thickness is recognized.

x: There are a trace of water drop, undulation and wrinkles, and both of a surface state and irregularity in thickness are poor.

TABLE 7

| | immersion in pure water | immersion in an aqueous sulfuric acid solution | immersion in pure water | drying |
|---|---|---|---|---|
| 300 µm coating product | 30° C., 30 min. | 30° C., 30 min. | 30° C., 40 min. | 25° C., 30 min. |
| 450 µm coating product | 30° C., 45 min. | 30° C., 45 min. | 30° C., 60 min. | 25° C., 45 min. |
| 600 µm coating product | 30° C., 60 min. | 30° C., 60 min. | 30° C., 80 min. | 25° C., 60 min. |

TABLE 8

| | Example 9 | | | | Comparative Example 14 | | | | |
|---|---|---|---|---|---|---|---|---|---|
| | 1 | 2 | 3 | 4 | 1 | 2 | 3 | 4 | 5 |
| solvent content after immersion in pure water [% by mass] | 1.7 | 2.3 | 4.4 | 2.1 | 2.8 | 5.9 | 2.7 | 3.1 | 5.5 |
| solvent-removing speed [g/m$^2$ · min] | 8.8 | 18.5 | 23.1 | 18.6 | 22.6 | 27.4 | 10.9 | 28.1 | 35.7 |
| membrane surface quality after solvent removal | ○ | ○ | Δ | ○ | x | x | Δ | x | x |
| membrane thickness [μm] | 50 | 80 | 102 | 49 | 85 | 101 | 47 | 80 | 98 |
| standard deviation of membrane thickness | 0.1 | 0.1 | 2.6 | 0.2 | 4.0 | 3.1 | 3.4 | 5.9 | 8.4 |
| difference R3 in height between the convex part and the concave part on the membrane [μm] | 0.1 | 5.2 | 9.3 | 0.1 | 9.8 | 15.3 | 4.9 | 20.4 | 22.9 |
| difference R4 in pore diameter between the maximum and the minimum [nm] | 0.4 | 1.2 | 4.4 | 0.4 | 1.2 | 8.9 | 3.4 | 4.4 | 11.2 |
| ion exchange capacity [meq/g] | 1.27 | 1.26 | 1.27 | 1.26 | 1.27 | 1.25 | 1.26 | 1.27 | 1.27 |
| ion conductivity (25° C. in water) [S/cm] | 0.022 | 0.020 | 0.025 | 0.023 | 0.026 | 0.024 | 0.023 | 0.024 | 0.028 |
| difference R5 in ion conductivity (25° C. in water) between the maximum and the minimum [S/cm] | 0.001 | 0.004 | 0.007 | 0.000 | 0.009 | 0.010 | 0.006 | 0.011 | 0.014 |
| methanol permeation coefficient [mmol/m$^2$/sec] | 0.121 | 0.119 | 0.127 | 0.106 | 0.142 | 0.120 | 0.131 | 0.121 | 0.112 |
| difference R6 in methanol permeation coefficient between the maximum and the minimum [mmol/m$^2$/sec] | 0.002 | 0.004 | 0.014 | 0.003 | 0.011 | 0.027 | 0.006 | 0.017 | 0.031 |

TABLE 9

| | Example 9 | | | | | Comparative Example 14 | | | |
|---|---|---|---|---|---|---|---|---|---|
| | 5 | 6 | 7 | 8 | 9 | 6 | 7 | 8 | 9 |
| solvent content after immersion in pure water [% by mass] | 1.2 | 2.6 | 3.9 | 1.6 | 2.9 | 3.6 | 3 | 3.2 | 2.2 |
| solvent-removing speed [g/m$^2$ · min] | 6.5 | 11.4 | 17.2 | 7.9 | 16.1 | 26.1 | 11.3 | 24.7 | 31.9 |
| membrane surface quality after solvent removal | ○ | ○ | ○ | ○ | ○ | x | Δ | x | x |
| membrane thickness [μm] | 48 | 78 | 115 | 52 | 75 | 109 | 48 | 82 | 112 |
| standard deviation of membrane thickness | 0.1 | 0.2 | 1.7 | 0.2 | 0.5 | 4.2 | 4.4 | 6.4 | 7.6 |
| difference R3 in height between the convex part and the concave part on the membrane [μm] | 0.1 | 3.2 | 6.2 | 0.2 | 6.6 | 15.8 | 1.9 | 8.4 | 18.7 |
| difference R4 in pore diameter between the maximum and the minimum [nm] | 0.3 | 0.5 | 0.5 | 0.3 | 0.4 | 2.5 | 1.6 | 5.2 | 9.8 |
| ion exchange capacity [meq/g] | 1.26 | 1.27 | 1.26 | 1.25 | 1.27 | 1.26 | 1.27 | 1.25 | 1.28 |
| ion conductivity (25° C. in water) [S/cm] | 0.021 | 0.019 | 0.022 | 0.018 | 0.020 | 0.024 | 0.019 | 0.021 | 0.026 |
| difference R5 in ion conductivity (25° C. in water) between the maximum and the minimum [S/cm] | 0.001 | 0.003 | 0.003 | 0.003 | 0.004 | 0.011 | 0.006 | 0.012 | 0.014 |
| methanol permeation coefficient [mmol/m$^2$/sec] | 0.124 | 0.123 | 0.119 | 0.125 | 0.123 | 0.122 | 0.122 | 0.121 | 0.124 |
| difference R6 in methanol permeation coefficient between the maximum and the minimum [mmol/m$^2$/sec] | 0.001 | 0.003 | 0.009 | 0.002 | 0.004 | 0.011 | 0.006 | 0.012 | 0.015 |

TABLE 10

|  | Example No. or Comparative Example No. | | | | | | | | |
| --- | --- | --- | --- | --- | --- | --- | --- | --- | --- |
|  | Example 9 | | | | | Comparative Example 14 | | | |
|  | 10 | 11 | 12 | 13 | 14 | 10 | 11 | 12 | 13 |
| solvent content after immersion in pure water [% by mass] | 1.5 | 3.6 | 3.4 | 2.1 | 1.2 | 9 | 7.4 | 8.4 | 3.1 |
| solvent-removing speed [g/m² · min] | 5.4 | 9.9 | 20.2 | 7.2 | 10.4 | 6.2 | 5.3 | 8.1 | 22.8 |
| membrane surface quality after solvent removal | ○ | ○ | Δ | ○ | ○ | Δ | x | x | x |
| membrane thickness [μm] | 47 | 72 | 104 | 49 | 77 | 87 | 47 | 79 | 109 |
| standard deviation of membrane thickness | 0.1 | 1.2 | 2.4 | 0.2 | 1.8 | 6.3 | 3.4 | 4.2 | 7.6 |
| difference R3 in height between the convex part and the concave part on the membrane [μm] | 0.1 | 3.9 | 6.2 | 0.2 | 2.4 | 9.4 | 2.5 | 14.4 | 20.6 |
| difference R4 in pore diameter between the maximum and the minimum [nm] | 0.1 | 0.3 | 3.5 | 0.3 | 0.7 | 16.2 | 1.3 | 10.6 | 18.5 |
| ion exchange capacity [meq/g] | 1.28 | 1.27 | 1.26 | 1.26 | 1.26 | 1.25 | 1.27 | 1.26 | 1.25 |
| ion conductivity (25° C. in water) [S/cm] | 0.020 | 0.020 | 0.019 | 0.018 | 0.019 | 0.019 | 0.017 | 0.018 | 0.019 |
| difference R5 in ion conductivity (25° C. in water) between the maximum and the minimum [S/cm] | 0.001 | 0.002 | 0.007 | 0.002 | 0.002 | 0.009 | 0.006 | 0.013 | 0.015 |
| methanol permeation coefficient [mmol/m²/sec] | 0.098 | 0.121 | 0.118 | 0.111 | 0.096 | 0.114 | 0.098 | 0.103 | 0.097 |
| difference R6 in methanol permeation coefficient between the maximum and the minimum [mmol/m²/sec] | 0.002 | 0.004 | 0.007 | 0.001 | 0.002 | 0.009 | 0.007 | 0.010 | 0.013 |

Example 10

A polymer having the logarithmic viscosity of 1.37 dl/g and the softening temperature of 250° C. was obtained in the same manner as in Example 1 except for using 38.8 g of 3,3'-sodium disulfonate-4,4'-dichlorodiphenylsulfone (abbreviated symbol: S-DCDPS) in which bonding water was removed, 53.5 g of 2,6-dichlorobenzonitrile (abbreviated symbol: DCBN), 18.2 g of 4,4'-biphenol (abbreviated symbol: BP), 64.0 g of 4,4'-thiobisphenol (abbreviated symbol: BPS), 59.4 g of potassium carbonate, and 375.3 g of N-methyl-2-pyrrolidone (abbreviated symbol: NMP) as raw materials.

Further, a polymer solution was prepared so as to have a polymer concentration of 26% by mass, and after the preparation, a polymer electrolyte membrane having a coating thickness of 300 μm was obtained in the same manner as in Example 9. Evaluation results of the obtained polymer electrolyte membranes are shown in Tables 11 and 12.

TABLE 11

|  | temperature of hot air to be blown to the coating membrane surface [° C.] | | | | | |
| --- | --- | --- | --- | --- | --- | --- |
|  | constant temperature at 80° C. | | constant temperature at 100° C. | | constant temperature at 110° C. | |
|  | Example No. or Comparative Example No. | | | | | |
|  | Example 10 | Comparative Example 15 | Example 10 | Comparative Example 15 | Example 10 | Comparative Example 15 |
|  | 1 | 2 | 1 | 3 | 4 | 2 | 5 | 6 | 3 |
| velocity of wind at the coating membrane surface [m/min] | 5 | 10 | 20 | 0.5 | 5 | 10 | 0.1 | 0.5 | 5 |
| coating thickness [μm] | 300 | 300 | 300 | 300 | 300 | 300 | 300 | 300 | 300 |
| drying time [min] | 20 | 15 | 10 | 30 | 20 | 15 | 60 | 30 | 20 |
| solvent content after drying [% by mass] | 25.4 | 22.1 | 30.9 | 19.2 | 20.7 | 27.7 | 17.3 | 19.4 | 22.6 |
| drying speed $R_1$ [g/m² · min] | 42 | 51 | 67 | 27 | 48 | 59 | 19.5 | 27.1 | 70.8 |
| $R_1 \cdot T$ [g/m² · min] | 42 | 51 | 67 | 27 | 48 | 59 | 19.5 | 27.1 | 70.8 |
| membrane surface quality after drying | ○ | ○ | Δ | ○ | ○ | Δ | ○ | ○ | x |

TABLE 11-continued

| | temperature of hot air to be blown to the coating membrane surface [° C.] | | | | | | | | |
|---|---|---|---|---|---|---|---|---|---|
| | constant temperature at 80° C. | | constant temperature at 100° C. | | | constant temperature at 110° C. | | | |
| | Example No. or Comparative Example No. | | | | | | | | |
| | Example 10 | Comparative Example 15 | Example 10 | | Comparative Example 15 | Example 10 | | Comparative Example 15 |
| | 1 | 2 | 1 | 3 | 4 | 2 | 5 | 6 | 3 |
| membrane thickness [μm] | 59 | 58 | 60 | 57 | 62 | 74 | 53 | 58 | 60 |
| standard deviation of membrane thickness | 0.4 | 0.5 | 4.4 | 0.5 | 0.3 | 3.7 | 0.3 | 0.6 | 4.9 |
| difference R3 in height between the convex part and the concave part on the membrane [μm] | 0.4 | 0.7 | 3.1 | 0.7 | 0.8 | 4.8 | 0.4 | 0.6 | 3.1 |

TABLE 12

| | Example No. or Comparative Example No. | | | | | | | | |
|---|---|---|---|---|---|---|---|---|---|
| | Example 10 | Comparative Example 15 | Example 10 | | Comparative Example 15 | Example 10 | | Comparative Example 15 |
| | 1 | 2 | 1 | 3 | 4 | 2 | 5 | 6 | 3 |
| solvent content after immersion in pure water [% by mass] | 1.7 | 1.4 | 1.2 | 1.5 | 1.2 | 1.1 | 1.5 | 2.1 | 7.4 |
| solvent-removing speed [g/m$^2$ · min] | 8.1 | 6.9 | 10.2 | 5.8 | 6.9 | 11.2 | 4.8 | 5.8 | 5.6 |
| membrane surface quality after solvent removal | ○ | ○ | Δ | ○ | ○ | Δ | ○ | ○ | x |
| membrane thickness [μm] | 42 | 44 | 42 | 47 | 49 | 51 | 45 | 49 | 44 |
| standard deviation of membrane thickness | 0.1 | 0.2 | 2.9 | 0.3 | 0.2 | 3.7 | 0.1 | 0.2 | 4.7 |
| difference R3 in height between the convex part and the concave part on the membrane [μm] | 0.1 | 0.2 | 1.7 | 0.4 | 0.2 | 1.6 | 0.1 | 0.2 | 3.7 |
| difference R4 in pore diameter between the maximum and the minimum [nm] | 0.2 | 0.3 | 2.2 | 0.2 | 0.1 | 1.4 | 0.1 | 0.3 | 2.2 |
| ion exchange capacity [meq/g] | 1.08 | 1.04 | 1.03 | 1.01 | 1.03 | 1.06 | 1.03 | 1.03 | 1.05 |
| ion conductivity (25° C. in water) [S/cm] | 0.024 | 0.023 | 0.025 | 0.026 | 0.025 | 0.029 | 0.025 | 0.024 | 0.023 |
| difference R5 in ion conductivity (25° C. in water) between the maximum and the minimum [S/cm] | 0.002 | 0.002 | 0.006 | 0.003 | 0.001 | 0.008 | 0.002 | 0.003 | 0.010 |
| methanol permeation coefficient [mmol/m$^2$/sec] | 0.067 | 0.068 | 0.071 | 0.067 | 0.066 | 0.069 | 0.065 | 0.064 | 0.062 |
| difference R6 in methanol permeation coefficient between the maximum and the minimum [mmol/m$^2$/sec] | 0.003 | 0.002 | 0.010 | 0.003 | 0.003 | 0.014 | 0.002 | 0.002 | 0.011 |

Example 11

A polymer having the logarithmic viscosity of 0.63 dl/g and the softening temperature of 182° C. was obtained in the same manner as in Example 9 except for using 81.0 g of dried S-DCDPS, 72.9 g of DCBN, 191.6 g of an end hydroxyl group-containing phenylene ether oligomer (SPECIANOL DPE-PL; made by DIC Corporation, a mixture containing components expressed by the chemical formula 15 wherein n is 1 to 8 and a mean value of n is 5) (abbreviated symbol: DPE), 89.5 g of potassium carbonate, 1116.1 g of NMP and changing the reaction time to 8 hours.

Further, a polymer solution was prepared so as to have a polymer concentration of 30% by mass, and after the preparation, a polymer electrolyte membrane having a coating thickness of 300 μm was obtained in the same manner as in Example 1. Evaluation results of the obtained polymer electrolyte membranes are shown in Tables 13 and 14.

TABLE 13

| | temperature of hot air to be blown to the coating membrane surface [° C.] | | | | | | | | |
|---|---|---|---|---|---|---|---|---|---|
| | constant temperature at 80° C. | | | constant temperature at 100° C. | | | constant temperature at 110° C. | | |
| | Example No. or Comparative Example No. | | | | | | | | |
| | Example 11 | | Comparative Example 16 | Example 11 | | Comparative Example 16 | Example 11 | | Comparative Example 16 |
| | 1 | 2 | 1 | 3 | 4 | 2 | 5 | 6 | 3 |
| velocity of wind at the coating membrane surface [m/min] | 5 | 10 | 20 | 0.5 | 5 | 10 | 0.1 | 0.5 | 5 |
| coating thickness [μm] | 300 | 300 | 300 | 300 | 300 | 300 | 300 | 300 | 300 |
| drying time [min] | 20 | 15 | 10 | 30 | 20 | 15 | 60 | 30 | 20 |
| solvent content after drying [% by mass] | 27.6 | 28.1 | 36.2 | 24.8 | 26.3 | 30.2 | 19.8 | 25.7 | 27.6 |
| drying speed $R_1$ [g/m² · min] | 36 | 43 | 57 | 22 | 44 | 59 | 13.8 | 21.7 | 59 |
| $R_1 \cdot T$ [g/m² · min] | 36 | 43 | 57 | 22 | 44 | 59 | 13.8 | 21.7 | 59 |
| membrane surface quality after drying | ○ | ○ | Δ | ○ | ○ | Δ | ○ | ○ | x |
| membrane thickness [μm] | 65 | 67 | 71 | 61 | 66 | 79 | 59 | 69 | 69 |
| standard deviation of membrane thickness | 0.1 | 0.3 | 3.1 | 0.1 | 0.4 | 2.9 | 0.2 | 0.3 | 2.2 |
| difference R3 in height between the convex part and the concave part on the membrane [μm] | 0.1 | 0.2 | 1.9 | 0.2 | 0.3 | 2.8 | 0.2 | 0.3 | 2.8 |

TABLE 14

| | Example No. or Comparative Example No. | | | | | | | | |
|---|---|---|---|---|---|---|---|---|---|
| | Example 11 | | Comparative Example 16 | Example 11 | | Comparative Example 16 | Example 11 | | Comparative Example 16 |
| | 1 | 2 | 1 | 3 | 4 | 2 | 5 | 6 | 3 |
| solvent content after immersion in pure water [% by mass] | 0.6 | 0.5 | 0.3 | 0.9 | 1.2 | 0.4 | 1.2 | 1.4 | 0.7 |
| solvent-removing speed [g/m² · min] | 10 | 10.5 | 14.4 | 8.3 | 9.5 | 11.8 | 6.3 | 9.6 | 10.6 |
| membrane surface quality after solvent removal | ○ | ○ | Δ | ○ | ○ | Δ | ○ | ○ | x |
| membrane thickness [μm] | 48 | 50 | 46 | 47 | 51 | 55 | 45 | 54 | 53 |
| standard deviation of membrane thickness | 0.1 | 0.2 | 2.4 | 0.1 | 0.3 | 2.5 | 0.2 | 0.4 | 1.7 |
| difference R3 in height between the convex part and the concave part on the membrane [μm] | 0.1 | 0.1 | 1.5 | 0.1 | 0.2 | 1.6 | 0.1 | 0.2 | 2.8 |
| difference R4 in pore diameter between the maximum and the minimum [nm] | 0.2 | 0.3 | 2.0 | 0.2 | 0.2 | 1.2 | 0.3 | 0.4 | 2.4 |
| ion exchange capacity [meq/g] | 0.96 | 0.97 | 0.94 | 0.95 | 0.95 | 0.97 | 0.96 | 0.94 | 0.96 |
| ion conductivity (25° C. in water) [S/cm] | 0.022 | 0.020 | 0.025 | 0.023 | 0.024 | 0.025 | 0.023 | 0.020 | 0.021 |
| difference R5 in ion conductivity (25° C. in water) between the maximum and the minimum [S/cm] | 0.002 | 0.002 | 0.006 | 0.002 | 0.001 | 0.008 | 0.002 | 0.003 | 0.010 |
| methanol permeation coefficient [mmol/m²/sec] | 0.065 | 0.068 | 0.071 | 0.067 | 0.063 | 0.065 | 0.064 | 0.068 | 0.057 |
| difference R6 in methanol permeation coefficient between the maximum and the minimum [mmol/m²/sec] | 0.004 | 0.002 | 0.008 | 0.003 | 0.002 | 0.009 | 0.002 | 0.003 | 0.011 |

Example 12

A polymer was synthesized in the same manner as in Example using 536 g of a 3,3'-disulfo-4,4'-dichlorodiphenyl ketone disodium salt in place of 579.1 g of 3,3'-disulfo-4,4'-dichlorodiphenylsulfone disodium salt. The logarithmic viscosity of the obtained polymer was 0.87 dL/g.

Further, a polymer solution was prepared so as to have a polymer concentration of 28% by mass, and after the preparation, a polymer electrolyte membrane having a coating thickness of 300 μm was obtained in the same manner as in Example 9. Evaluation results relevant to the quality of the obtained polymer electrolyte membranes are shown in Tables 15 and 16.

TABLE 15

| | temperature of hot air to be blown to the coating membrane surface [° C.] | | | | | |
|---|---|---|---|---|---|---|
| | constant temperature at 80° C. | | constant temperature at 100° C. | | constant temperature at 110° C. | |
| | Example No. or Comparative Example No. | | | | | |
| | Example 12 1 | Comparative Example 17 1 | Example 12 2 | Comparative Example 17 2 | Example 12 3 | Comparative Example 17 3 |
| velocity of wind at the coating membrane surface [m/min] | 10 | 20 | 5 | 10 | 0.5 | 5 |
| coating thickness [μm] | 300 | 300 | 300 | 300 | 300 | 300 |
| drying time [min] | 15 | 10 | 20 | 15 | 30 | 20 |
| solvent content after the step ($A_2$) [% by mass] | 25.5 | 33.1 | 21.2 | 26.9 | 22.7 | 21.6 |
| drying speed $R_1$ [g/m² · min] | 45 | 57 | 42 | 61 | 30.1 | 68.3 |
| $R_1 \cdot T$ [g/m² · min] | 45 | 57 | 42 | 61 | 30.1 | 68.3 |
| membrane surface quality after the step ($A_2$) | ○ | Δ | ○ | Δ | ○ | x |

TABLE 16

| | Example No. or Comparative Example No. | | | | | |
|---|---|---|---|---|---|---|
| | Example 12 1 | Comparative Example 17 1 | Example 12 2 | Comparative Example 17 2 | Example 12 3 | Comparative Example 17 3 |
| solvent content after the step ($A_3$) [% by mass] | 0.9 | 1.1 | 0.7 | 1.7 | 0.9 | 5.4 |
| solvent-removing speed [g/m² · min] | 7.2 | 14.8 | 8.4 | 11.9 | 11.8 | 9.7 |
| membrane surface quality after the step ($A_3$) | ○ | Δ | ○ | Δ | ○ | x |

Example 13

0.60 g of 9,9-bis(4-hydroxyphenyl)fluorene, 1.00 g of bisphenol S, 1.45 g of difluorodiphenylsulfone, and 0.91 g of calcium carbonate were weighed into a 50 ml-four necked flask, and 20 ml of NMP was added under a nitrogen gas flow, and the reaction temperature was set at around 175° C. to continue the reaction for about 5 hours. After left standing to cool, the reaction product was reprecipitated in about 100 ml of methanol and subjected to water washing treatments three times using a mixer to obtain a polymer. The logarithmic viscosity of the obtained polymer was 0.61 dL/g. The polymer sample was stirred with concentrated sulfuric acid (98%) at room temperature by a magnetic stirrer to carry out a sulfonating reaction. After the reaction, a sulfuric acid solution was charged in excess ice water to terminate the reaction, and the generated precipitate was taken by filtration, and washed with water to obtain a sulfonic acid group-containing polymer.

Further, a polymer solution was prepared so as to have a polymer concentration of 30% by mass, and after the preparation, a polymer electrolyte membrane having a coating thickness of 300 μm was obtained in the same manner as in Example 9. Evaluation results relevant to the quality of the obtained polymer electrolyte membranes are shown in Tables 17 and 18.

TABLE 17

| | temperature of hot air to be blown to the coating membrane surface [° C.] | | | | | |
|---|---|---|---|---|---|---|
| | constant temperature at 80° C. | | constant temperature at 100° C. | | constant temperature at 110° C. | |
| | Example No. or Comparative Example No. | | | | | |
| | Example 13-1 | Comparative Example 18-1 | Example 13-2 | Comparative Example 18-2 | Example 13-3 | Comparative Example 18-3 |
| velocity of wind at the coating membrane surface [m/min] | 10 | 20 | 5 | 10 | 0.5 | 5 |
| coating thickness [μm] | 300 | 300 | 300 | 300 | 300 | 300 |
| drying time [min] | 15 | 10 | 20 | 15 | 30 | 20 |
| solvent content after the step ($A_2$) [% by mass] | 27.7 | 34.1 | 25.3 | 30.2 | 29.3 | 29.8 |
| drying speed $R_1$ [g/m$^2$ · min] | 39 | 60 | 37 | 59 | 29.4 | 63.1 |
| $R_1 \cdot T$ [g/m$^2$ · min] | 39 | 60 | 37 | 59 | 29.4 | 63.1 |
| membrane surface quality after the step ($A_2$) | ○ | Δ | ○ | Δ | ○ | x |

TABLE 18

| | Example No. or Comparative Example No. | | | | | |
|---|---|---|---|---|---|---|
| | Example 13-1 | Comparative Example 18-1 | Example 13-2 | Comparative Example 18-2 | Example 13-3 | Comparative Example 18-3 |
| solvent content after the step ($A_3$) [% by mass] | 0.2 | 0.4 | 0.6 | 0.4 | 0.7 | 0.7 |
| solvent-removing speed [g/m$^2$ · min] | 11.1 | 13.1 | 8.6 | 14.8 | 8.1 | 12.7 |
| membrane surface quality after the step ($A_3$) | ○ | Δ | ○ | x | ○ | x |

Example 14

15 g of 3,3',4,4'-tetraminodiphenylsulfone, 14 g of monosodium 2,5-dicarboxybenzenesulfonate, 205 g of polyphosphoric acid (containing 75% of phosphorus pentoxide), and 164 g of phosphorus pentoxide were weighed in a polymerization container. Nitrogen was flowed and the temperature was increased to 100° C. while gently stirring on an oil bath. After retaining at 100° C. for 1 hour, the temperature was increased to 150° C. and retained for 1 hour, and the temperature was increased to 200° C. and polymerization was carried out for 4 hours. The polymerized product was stood to cool after completion of the polymerization, water was added to take out the polymerized product. The polymer was repeatedly washed with water three times by using a household mixer, and sodium carbonate was added to the polymer immersed in water after the repeated washing for neutralization, and washing with water was further repeated to confirm that the pH of the washing solution was neutral and did not change. The obtained polymer was dried under reduced pressure at 80° C. overnight. The logarithmic viscosity of the polymer was 1.92 dL/g, and the softening temperature was not found at a temperature below 250° C.

Further, a polymer solution was prepared so as to have a polymer concentration of 20% by mass, and after the preparation, a polymer electrolyte membrane having a coating thickness of 300 μm was obtained in the same manner as in Example 9. Evaluation results relevant to the quality of the obtained polymer electrolyte membranes are shown in Tables 19 and 20.

TABLE 19

| | temperature of hot air to be blown to the coating membrane surface [° C.] | | | | | |
|---|---|---|---|---|---|---|
| | constant temperature at 80° C. | | constant temperature at 100° C. | | constant temperature at 110° C. | |
| | Example No. or Comparative Example No. | | | | | |
| | Example 14 1 | Comparative Example 19 1 | Example 14 2 | Comparative Example 19 2 | Example 14 3 | Comparative Example 19 3 |
| velocity of wind at the coating membrane surface [m/min] | 10 | 20 | 5 | 10 | 0.5 | 5 |
| coating thickness [μm] | 300 | 300 | 300 | 300 | 300 | 300 |
| drying time [min] | 15 | 10 | 20 | 15 | 30 | 20 |
| solvent content after the step ($A_2$) [% by mass] | 24.2 | 30.2 | 23.8 | 26.1 | 20.4 | 25.8 |
| drying speed $R_1$ [g/m$^2$ · min] | 48 | 59 | 48 | 61 | 31.1 | 63.9 |
| $R_1 \cdot T$ [g/m$^2$ · min] | 48 | 59 | 48 | 61 | 31.1 | 63.9 |
| membrane surface quality after the step ($A_2$) | ○ | Δ | ○ | Δ | ○ | x |

TABLE 20

| | Example No. or Comparative Example No. | | | | | |
|---|---|---|---|---|---|---|
| | Example 14 1 | Comparative Example 19 1 | Example 14 2 | Comparative Example 19 2 | Example 14 3 | Comparative Example 19 3 |
| solvent content after the step ($A_3$) [% by mass] | 0.4 | 1.2 | 0.6 | 0.9 | 1.1 | 1.7 |
| solvent-removing speed [g/m$^2$ · min] | 9.4 | 15.7 | 9.1 | 14.3 | 8.8 | 12.2 |
| membrane surface quality after the step ($A_3$) | ○ | Δ | ○ | Δ | ○ | x |

Example 15

1.83 g of 3,3',4,4'-tetraminodiphenylsulfone, 0.53 g of monosodium 2,5-dicarboxybenzenesulfonate, 1.13 g of 3,5-dicarboxyphenylphosphonate, 25 g of polyphosphoric acid (containing 75% of phosphorus pentoxide), and 20 g of phosphorus pentoxide were weighed in a polymerization container. Nitrogen was flowed and the temperature was increased to 100° C. while gently stirring on an oil bath. After retaining at 100° C. for 1 hour, the temperature was increased to 150° C. and retained for 1 hour, and the temperature was increased to 200° C. and polymerization was carried out for 6 hours. The polymerized product was stood to cool after completion of the polymerization, water was added to take out the polymerized product. The polymer was repeatedly washed with water three times by using a household mixer, and sodium carbonate was added to the polymer immersed in water after the repeated washing for neutralization, and washing with water was further repeated to confirm that the pH of the washing solution was neutral and did not change. The obtained polymer was dried under reduced pressure at 80° C. overnight. The logarithmic viscosity of the polymer was 1.18 dL/g, and the softening temperature was not found at a temperature below 250° C.

Further, a polymer solution was prepared so as to have a polymer concentration of 27% by mass, and after the preparation, a polymer electrolyte membrane having a coating thickness of 300 μm was obtained in the same manner as in Example 9. Evaluation results relevant to the quality of the obtained polymer electrolyte membranes are shown in Tables 21 and 22.

TABLE 21

| | temperature of hot air to be blown to the coating membrane surface [° C.] | | | | | |
|---|---|---|---|---|---|---|
| | constant temperature at 80° C. | | constant temperature at 100° C. | | constant temperature at 110° C. | |
| | Example No. or Comparative Example No. | | | | | |
| | Example 15-1 | Comparative Example 20-1 | Example 15-2 | Comparative Example 20-2 | Example 15-3 | Comparative Example 20-3 |
| velocity of wind at the coating membrane surface [m/min] | 10 | 20 | 5 | 10 | 0.5 | 5 |
| coating thickness [μm] | 300 | 300 | 300 | 300 | 300 | 300 |
| drying time [min] | 15 | 10 | 20 | 15 | 30 | 20 |
| solvent content after the step ($A_2$) [% by mass] | 24.3 | 37.7 | 22.2 | 28.1 | 23.7 | 25.8 |
| drying speed $R_1$ [g/m² · min] | 39 | 62 | 41 | 58 | 28.5 | 62.3 |
| $R_1 \cdot T$ [g/m² · min] | 39 | 62 | 41 | 58 | 28.5 | 62.3 |
| membrane surface quality after the step ($A_2$) | ○ | x | ○ | Δ | ○ | x |

TABLE 22

| | Example No. or Comparative Example No. | | | | | |
|---|---|---|---|---|---|---|
| | Example 15-1 | Comparative Example 20-1 | Example 15-2 | Comparative Example 20-2 | Example 15-3 | Comparative Example 20-3 |
| solvent content after the step ($A_3$) [% by mass] | 1.1 | 1.3 | 0.7 | 1.4 | 0.9 | 1.1 |
| solvent-removing speed [g/m² · min] | 8.3 | 15.1 | 7.6 | 11.2 | 9.6 | 14.7 |
| membrane surface quality after the step ($A_3$) | ○ | x | ○ | Δ | ○ | x |

In Examples 9 to 16, defining a drying speed by hot air and a solvent-removing speed by immersion in pure water enables to secure stabile membrane quality such as small irregularity in thickness and less wrinkles and less unevenness on the entire membrane surface. At the same time, membrane characteristics such as ion conductivity and methanol permeability are stable, and it is found that these membranes are good as polymer electrolyte membranes. On the other hand, in Comparative Examples 14 to 20, membrane quality cannot be secured at a drying speed by hot air out of the defined range, and when a solvent-removing speed by immersion in pure water is also in a range out of the defined range, the membrane quality tends to more deteriorate, and regarding membrane characteristics, fluctuation is large and it is found that the membranes are poor as polymer electrolyte membranes.

Industrial Applicability

According to the present invention, a very thin polymer electrolyte membrane can be produced as a uniform polymer electrolyte membrane with less irregularity in thickness, less wrinkles and less unevenness on the entire membrane surface. The polymer electrolyte membrane of the present invention can improve properties such as mechanical strength and fuel permeation suppressing property for preventing permeation of a fuel such as hydrogen, and therefore the polymer electrolyte membrane of the present invention is expected to contribute to the development of a solid polymer fuel cell.

The invention claimed is:

1. A method for producing a polymer electrolyte membrane including (A) a membrane formation step of forming a membrane-form product of an ionic group-containing polymer electrolyte on a support, (B) an acid treatment step of exchanging the ionic group into an acid type by bringing the membrane into contact with an inorganic acid-containing acidic liquid, (C) an acid removal step of removing a free acid in the acid-treated membrane, and (D) a drying step of drying the acid-removed membrane, wherein the steps (B) to (D) are carried out without separating the membrane from the support.

2. The method for producing a polymer electrolyte membrane according to claim 1, wherein the membrane formation step (A) includes ($A_1$) a casting step of casting a solvent solution of an ionic group-containing polymer electrolyte on a support to form a cast membrane, ($A_2$) a drying step of drying the cast membrane, and ($A_3$) a solvent-removing step of removing a solvent in the dried membrane with a liquid that is miscible with the solvent of the ionic group-containing polymer electrolyte, and wherein the steps ($A_2$) and (A3) are carried out without separating the membrane from the support.

3. The method for producing a polymer electrolyte membrane according to claim 2, wherein in the drying step ($A_2$), the cast membrane is dried to form a self-supporting membrane.

4. The method for producing a polymer electrolyte membrane according to claim 2, wherein the support is a polyethylene terephthalate film.

5. The method for producing a polymer electrolyte membrane according to claim 1, wherein the ionic group-containing polymer electrolyte has a repeating unit expressed by the general formula 1:

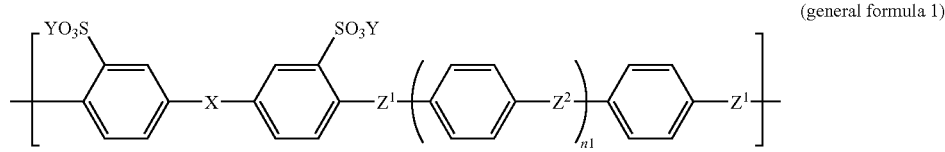

(general formula 1)

wherein, X represents a —S(=O)$_2$— group or a —C(=O)— group, Y represents H or a monovalent cation, Z1 represents either an O atom or an S atom, $Z^2$ represents any of an O atom, an S atom, a —C(CH$_3$)$_2$— group, a —C(CF$_3$)$_2$— group, a —CH$_2$— group, a cyclohexyl group, and a direct bond, and n1 represents an integer of 1 or more.

6. The method for producing a polymer electrolyte membrane according to claim 2, wherein the steps ($A_2$) and ($A_3$) are carried out without separating the membrane from the support, and wherein the cast membrane is dried to form a self-supporting membrane having a solvent content of 15 to 30% by mass under the condition such that a relationship between a coating thickness coefficient T of the polymer electrolyte solution and a drying speed $R_1$ in the drying step ($A_2$) is within the range of the following formula I:

$$2 < R_1 \cdot T < 56 \quad (I)$$

wherein $R_1$ is drying speed in g/m²·min, and T is a coating thickness of the polymer electrolyte solution in μm/300 μm.

7. The method for producing a polymer electrolyte membrane according to claim 6, wherein a solvent-removing speed $R_2$ in the solvent-removing step ($A_3$) is set to 1 to 20 g/m²·min to remove the solvent until a solvent content of less than 8% by mass is achieved.

8. The method for producing a polymer electrolyte membrane according to claim 4, wherein the ionic group-containing polymer electrolyte has a repeating unit expressed by the general formula 1:

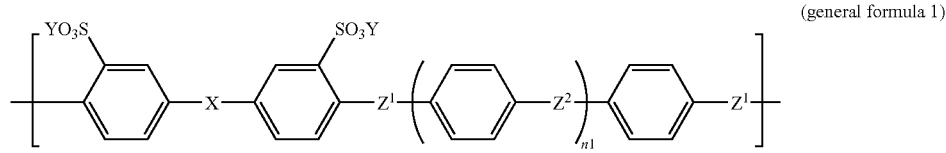

(general formula 1)

wherein X represents a —S(=O)$_2$— group or a —C(=O)— group, Y represents H or a monovalent cation, $Z^1$ represents either an O atom or an S atom, $Z^2$ represents any of an O atom, an S atom, a —C(CH$_3$)$_2$— group, a —C(CF$_3$)$_2$— group, a —CH$_2$— group, a cyclohexyl group, and a direct bond, and n1 represents an integer of 1 or more.

9. The method for producing a polymer electrolyte membrane according to claim 6, wherein an average pore diameter in the polymer electrolyte membrane by a DSC method is 0.1 to 10 nm.

10. The method for producing a polymer electrolyte membrane according to claim 6, wherein the solvent is at least one solvent selected from the group consisting of N-methyl-2-pyrrolidone, N,N-dimetylacetamide, N,N-dimethylformamide, tetramethylurea, dimethylimidazolidinone, dimethylsulfoxide, and hexamethylphosphoneamide, and wherein the liquid that is miscible with the solvent is water.

11. The method for producing a polymer electrolyte membrane according to claim 6, wherein the ionic group-containing polymer electrolyte is a polyarylene ether compound containing constituent units represented by the general formulas 14 and 15:

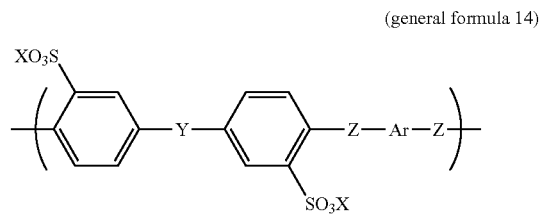

(general formula 14)

wherein, Ar is a bivalent aromatic group, Y is a sulfone group or a ketone group, X is H and/or a monovalent cation species, and Z is at least one selected from a direct bond, an ether bond and a thioether bond;

(general formula 15)

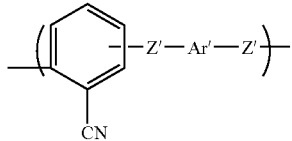

wherein, Ar' is a bivalent aromatic group, and Z' is at least one selected from a direct bond, an ether bond and a thioether bond.

12. The method for producing a polymer electrolyte membrane according to claim 2, wherein the ionic group-containing polymer electrolyte has a repeating unit expressed by the general formula 1:

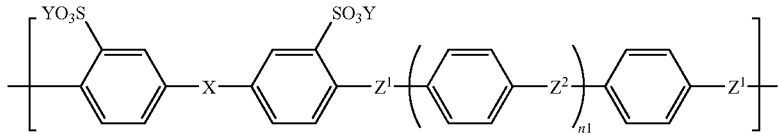

(general formula 1)

wherein X represents a —S(=O)$_2$— group or a —C(=O)— group, Y represents H or a monovalent cation, $Z^1$ represents either an O atom or an S atom, $Z^2$ represents any of an O atom, an S atom, a —C(CH$_3$)$_2$— group, a —C(CF$_3$)$_2$— group, a —CH$_2$— group, a cyclohexyl group, and a direct bond, and n1 represents an integer of 1 or more.

13. The method for producing a polymer electrolyte membrane according to claim 3, wherein the ionic group-containing polymer electrolyte has a repeating unit expressed by the general formula 1:

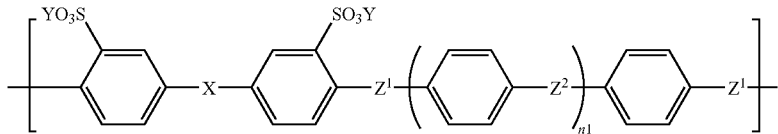

(general formula 1)

wherein X represents a —S(=O)$_2$— group or a —C(=O)— group, Y represents H or a monovalent cation, $Z^1$ represents either an O atom or an S atom, $Z^2$ represents any of an O atom, an S atom, a —C(CH$_3$)$_2$— group, a —C(CF$_3$)$_2$—group, a —CH$_2$—group, a cyclohexyl group, and a direct bond, and n1 represents an integer of 1 or more.

\* \* \* \* \*